(12) United States Patent
Hessing et al.

(10) Patent No.: US 9,333,415 B2
(45) Date of Patent: *May 10, 2016

(54) METHODS FOR HANDLING PLAYING CARDS WITH A CARD HANDLING DEVICE

(71) Applicant: Bally Gaming, Inc., Las Vegas, NV (US)

(72) Inventors: Lynn Hessing, Boise, ID (US); Daniel J. Mahoney, Star, ID (US); Steven J. Blad, Henderson, NV (US); Thompson A. Baker, Meridian, ID (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/275,734

(22) Filed: May 12, 2014

(65) Prior Publication Data

US 2014/0246831 A1 Sep. 4, 2014

Related U.S. Application Data

(63) Continuation of application No. 11/177,013, filed on Jul. 7, 2005, now Pat. No. 8,720,891, and a continuation of application No. 11/087,487, filed on Mar. 23, 2005, now Pat. No. 7,976,023, and a continuation of application No. 10/067,794, filed on Feb. 8, 2002, now Pat. No. 6,886,829.

(51) Int. Cl.
*A63F 9/24* (2006.01)
*A63F 1/12* (2006.01)
(Continued)

(52) U.S. Cl.
CPC .......... *A63F 1/12* (2013.01); *A63F 2003/00164* (2013.01); *A63F 2009/2404* (2013.01);
(Continued)

(58) Field of Classification Search
CPC . A63F 1/12; A63F 2003/00164; G07F 17/32; G07F 17/3293

USPC ................... 273/149 R; 463/12, 42
See application file for complete search history.

(56) References Cited

U.S. PATENT DOCUMENTS

| 130,281 A | 8/1872 | Coughlin |
| 205,030 A | 6/1878 | Heey |

(Continued)

FOREIGN PATENT DOCUMENTS

| AU | 50254/79 | 3/1980 |
| AU | 757636 B2 | 2/2003 |

(Continued)

OTHER PUBLICATIONS

Scarne's Encyclopedia of Games by John Scarne, 1973, "Super Contract Bridge", p. 153.

(Continued)

*Primary Examiner* — Michael Cuff
(74) *Attorney, Agent, or Firm* — TraskBritt

(57) ABSTRACT

The present invention features a playing card shuffling device, which through the use of a small image capturing means, captures an image of a face value of each card and stores the image in memory. This image is sorted in the format of a bitmap image. An operator of the device would be able to recall, through the use of a keypad, the images of the cards that comprised individual hands in the previous game. This feature allows for verification of a winning hand after a game has been completed. Thereby, a quick recheck of hands before playing a winning hand is performed. The face value of each card is determined by character recognition software. These card values would be stored in memory for archival access for use in monitoring the randomness of the game and determining the number of winnings hands.

16 Claims, 3 Drawing Sheets

(51) Int. Cl.
*A63F 3/00* (2006.01)
*G07F 17/32* (2006.01)

(52) U.S. Cl.
CPC ... *A63F2009/2419* (2013.01); *A63F 2250/285* (2013.01); *A63F 2250/58* (2013.01); *G07F 17/32* (2013.01); *G07F 17/3293* (2013.01)

(56) References Cited

U.S. PATENT DOCUMENTS

| | | |
|---|---|---|
| 609,730 A | 8/1898 | Booth |
| 673,154 A | 4/1901 | Bellows |
| 793,489 A | 6/1905 | Williams |
| 892,389 A | 7/1908 | Bellows |
| 1,014,219 A | 1/1912 | Hall |
| 1,043,109 A | 11/1912 | Hurm |
| 1,157,898 A | 10/1915 | Perret |
| 1,556,856 A | 10/1925 | Lipps |
| 1,850,114 A | 3/1932 | McCaddin |
| 1,885,276 A | 11/1932 | McKay |
| 1,955,926 A | 4/1934 | Matthaey |
| 1,992,085 A | 2/1935 | McKay |
| 1,998,690 A | 4/1935 | Shepherd et al. |
| 2,001,918 A | 5/1935 | Smith |
| 2,016,030 A | 10/1935 | Woodruff et al. |
| 2,043,343 A | 6/1936 | Warner |
| 2,060,096 A | 11/1936 | McCoy |
| 2,065,824 A | 12/1936 | Plass |
| 2,159,958 A | 5/1939 | Sachs |
| 2,185,474 A | 1/1940 | Nott |
| 2,254,484 A | 9/1941 | Hutchins |
| D132,360 S | 5/1942 | Gardner |
| 2,328,153 A | 8/1943 | Laing |
| 2,328,879 A | 9/1943 | Isaacson |
| 2,364,413 A | 12/1944 | Wittel |
| 2,525,305 A | 10/1950 | Lombard |
| 2,543,522 A | 2/1951 | Cohen |
| 2,588,582 A | 3/1952 | Sivertson |
| 2,661,215 A | 12/1953 | Stevens |
| 2,676,020 A | 4/1954 | Ogden |
| 2,692,777 A | 10/1954 | Miller |
| 2,701,720 A | 2/1955 | Ogden |
| 2,705,638 A | 4/1955 | Newcomb |
| 2,711,319 A | 6/1955 | Morgan et al. |
| 2,714,510 A | 8/1955 | Oppenlander et al. |
| 2,717,782 A | 9/1955 | Droll |
| 2,727,747 A | 12/1955 | Semisch, Jr. |
| 2,731,271 A | 1/1956 | Brown |
| 2,747,877 A | 5/1956 | Howard |
| 2,755,090 A | 7/1956 | Aldrich |
| 2,757,005 A | 7/1956 | Nothaft |
| 2,760,779 A | 8/1956 | Ogden et al. |
| 2,770,459 A | 11/1956 | Wilson |
| 2,778,643 A | 1/1957 | Williams |
| 2,778,644 A | 1/1957 | Stephenson |
| 2,782,040 A | 2/1957 | Matter |
| 2,790,641 A | 4/1957 | Adams |
| 2,793,863 A | 5/1957 | Liebelt |
| 2,815,214 A | 12/1957 | Hall |
| 2,821,399 A | 1/1958 | Heinoo |
| 2,914,215 A | 11/1959 | Neidig |
| 2,937,739 A | 5/1960 | Levy |
| 2,950,005 A | 8/1960 | MacDonald |
| RE24,986 E | 5/1961 | Stephenson |
| 3,067,885 A | 12/1962 | Kohler |
| 3,107,096 A | 10/1963 | Osborn |
| 3,124,674 A | 3/1964 | Edwards et al. |
| 3,131,935 A | 5/1964 | Gronneberg |
| 3,147,978 A | 9/1964 | Sjostrand |
| 3,222,071 A | 12/1965 | Lang |
| 3,235,741 A | 2/1966 | Plaisance |
| 3,288,308 A | 11/1966 | Gingher |
| 3,305,237 A | 2/1967 | Granius |
| 3,312,473 A | 4/1967 | Friedman et al. |
| 3,452,509 A | 7/1969 | Hauer |
| 3,530,968 A | 9/1970 | Ansell |
| 3,588,116 A | 6/1971 | Miura |
| 3,589,730 A | 6/1971 | Slay |
| 3,595,388 A | 7/1971 | Castaldi |
| 3,597,076 A | 8/1971 | Hubbard |
| 3,618,933 A | 11/1971 | Roggenstein |
| 3,627,331 A | 12/1971 | Erickson |
| 3,666,270 A | 5/1972 | Mazur |
| 3,680,853 A | 8/1972 | Houghton |
| 3,690,670 A | 9/1972 | Cassady et al. |
| 3,704,938 A | 12/1972 | Fanselow |
| 3,716,238 A | 2/1973 | Porter |
| 3,751,041 A | 8/1973 | Seifert |
| 3,761,079 A | 9/1973 | Azure |
| 3,810,627 A | 5/1974 | Levy |
| 3,861,261 A | 1/1975 | Maxey et al. |
| 3,897,954 A | 8/1975 | Erickson |
| 3,909,002 A | 9/1975 | Levy |
| 3,929,339 A | 12/1975 | Mattioli |
| 3,944,077 A | 3/1976 | Green |
| 3,944,230 A | 3/1976 | Fineman |
| 3,949,219 A | 4/1976 | Crouse |
| 3,968,364 A | 7/1976 | Miller |
| 4,023,705 A | 5/1977 | Reiner et al. |
| 4,033,590 A | 7/1977 | Pic |
| 4,072,930 A | 2/1978 | Lucero et al. |
| 4,088,265 A | 5/1978 | Garczynski |
| 4,151,410 A | 4/1979 | McMillan et al. |
| 4,159,581 A | 7/1979 | Lichtenberg |
| 4,162,649 A | 7/1979 | Thornton |
| 4,166,615 A | 9/1979 | Noguchi et al. |
| 4,232,861 A | 11/1980 | Maul |
| 4,280,690 A | 7/1981 | Hill |
| 4,283,709 A | 8/1981 | Lucero et al. |
| 4,310,160 A | 1/1982 | Willette |
| 4,339,134 A | 7/1982 | Macheel |
| 4,339,798 A | 7/1982 | Hedges et al. |
| 4,361,393 A | 11/1982 | Noto |
| 4,368,972 A | 1/1983 | Naramore |
| 4,369,972 A | 1/1983 | Parker |
| 4,374,309 A | 2/1983 | Walton |
| 4,377,285 A | 3/1983 | Kadlic |
| 4,385,827 A | 5/1983 | Naramore |
| 4,388,994 A | 6/1983 | Suda et al. |
| 4,397,469 A | 8/1983 | Carter |
| 4,421,312 A | 12/1983 | Delgado et al. |
| 4,421,501 A | 12/1983 | Scheffer |
| D274,069 S | 5/1984 | Fromm |
| 4,467,424 A | 8/1984 | Hedges et al. |
| 4,494,197 A | 1/1985 | Troy et al. |
| 4,497,488 A | 2/1985 | Plevyak et al. |
| 4,512,580 A | 4/1985 | Matviak |
| 4,513,969 A | 4/1985 | Samsel |
| 4,515,367 A | 5/1985 | Howard |
| 4,531,187 A | 7/1985 | Uhland et al. |
| 4,534,562 A | 8/1985 | Cuff et al. |
| 4,549,738 A | 10/1985 | Greitzer |
| 4,566,782 A | 1/1986 | Britt et al. |
| 4,575,367 A | 3/1986 | Karmel |
| 4,586,712 A | 5/1986 | Lorber et al. |
| 4,659,082 A | 4/1987 | Greenberg |
| 4,662,637 A | 5/1987 | Pfeiffer et al. |
| 4,662,816 A | 5/1987 | Fabrig |
| 4,667,959 A | 5/1987 | Pfeiffer et al. |
| 4,741,524 A | 5/1988 | Bromage |
| 4,750,743 A | 6/1988 | Nicoletti |
| 4,755,941 A | 7/1988 | Bacchi |
| 4,759,448 A | 7/1988 | Kawabata |
| 4,770,412 A | 9/1988 | Wolfe |
| 4,770,421 A | 9/1988 | Hoffman |
| 4,807,884 A | 2/1989 | Breeding |
| 4,822,050 A | 4/1989 | Normand et al. |
| 4,832,342 A | 5/1989 | Plevyak |
| 4,858,000 A | 8/1989 | Lu |
| 4,861,041 A | 8/1989 | Jones et al. |
| 4,876,000 A | 10/1989 | Mikhail |
| 4,900,009 A | 2/1990 | Kitahara et al. |
| 4,904,830 A | 2/1990 | Rizzuto |
| 4,921,109 A | 5/1990 | Hasuo et al. |

(56) References Cited

U.S. PATENT DOCUMENTS

| | | |
|---|---|---|
| 4,926,327 A | 5/1990 | Sidley |
| 4,948,134 A | 8/1990 | Suttle et al. |
| 4,951,950 A | 8/1990 | Normand et al. |
| 4,969,648 A | 11/1990 | Hollinger et al. |
| 4,993,587 A | 2/1991 | Abe |
| 4,995,615 A | 2/1991 | Cheng et al. |
| 5,000,453 A | 3/1991 | Stevens et al. |
| 5,039,102 A | 8/1991 | Miller et al. |
| 5,067,713 A | 11/1991 | Soules et al. |
| 5,078,405 A | 1/1992 | Jones et al. |
| 5,081,487 A | 1/1992 | Hoyer et al. |
| 5,096,197 A | 3/1992 | Embury |
| 5,102,293 A | 4/1992 | Schneider |
| 5,118,114 A | 6/1992 | Tucci et al. |
| 5,121,192 A | 6/1992 | Kazui |
| 5,121,921 A | 6/1992 | Friedman |
| 5,154,429 A | 10/1992 | LeVasseur et al. |
| 5,179,517 A | 1/1993 | Sarbin et al. |
| 5,197,094 A | 3/1993 | Tillery et al. |
| 5,199,710 A | 4/1993 | Lamle |
| 5,209,476 A | 5/1993 | Eiba et al. |
| 5,224,712 A | 7/1993 | Laughlin et al. |
| 5,240,140 A | 8/1993 | Huen |
| 5,248,142 A | 9/1993 | Breeding et al. |
| 5,257,179 A | 10/1993 | DeMar et al. |
| 5,259,907 A | 11/1993 | Soules et al. |
| 5,261,667 A | 11/1993 | Breeding |
| 5,267,248 A | 11/1993 | Reyner |
| 5,275,411 A | 1/1994 | Breeding |
| 5,276,312 A | 1/1994 | McCarthy |
| 5,283,422 A | 2/1994 | Storch et al. |
| 5,288,081 A | 2/1994 | Breeding et al. |
| 5,299,089 A | 3/1994 | Lwee |
| 5,303,921 A | 4/1994 | Breeding |
| 5,344,146 A | 9/1994 | Lee |
| 5,356,145 A | 10/1994 | Verschoor |
| 5,362,053 A | 11/1994 | Miller et al. |
| 5,374,061 A | 12/1994 | Albrecht et al. |
| 5,377,973 A | 1/1995 | Jones et al. |
| 5,382,024 A | 1/1995 | Blaha |
| 5,382,025 A | 1/1995 | Sklansky et al. |
| 5,390,910 A | 2/1995 | Mandel et al. |
| 5,397,128 A | 3/1995 | Hesse et al. |
| 5,397,133 A | 3/1995 | Penzias et al. |
| 5,416,308 A | 5/1995 | Hood et al. |
| 5,431,399 A | 7/1995 | Kelley et al. |
| 5,431,407 A | 7/1995 | Hofberg et al. |
| 5,437,462 A | 8/1995 | Breeding et al. |
| 5,445,377 A | 8/1995 | Steinbach |
| 5,470,079 A | 11/1995 | LeStrange et al. |
| D365,853 S | 1/1996 | Zadro |
| 5,489,101 A | 2/1996 | Moody et al. |
| 5,515,477 A | 5/1996 | Sutherland |
| 5,524,888 A | 6/1996 | Heidel |
| 5,531,448 A | 7/1996 | Moody et al. |
| 5,544,892 A | 8/1996 | Breeding et al. |
| 5,575,475 A | 11/1996 | Steinbach |
| 5,584,483 A | 12/1996 | Sines et al. |
| 5,586,766 A | 12/1996 | Forte et al. |
| 5,586,936 A | 12/1996 | Bennett et al. |
| 5,605,334 A | 2/1997 | McCrea et al. |
| 5,613,912 A | 3/1997 | Slater et al. |
| 5,632,483 A | 5/1997 | Garczynski et al. |
| 5,636,843 A | 6/1997 | Roberts et al. |
| 5,651,548 A | 7/1997 | French et al. |
| 5,655,961 A | 8/1997 | Acres et al. |
| 5,669,816 A | 9/1997 | Garczynski et al. |
| 5,676,231 A | 10/1997 | Legras et al. |
| 5,676,372 A | 10/1997 | Sines et al. |
| 5,681,039 A | 10/1997 | Miller et al. |
| 5,683,085 A | 11/1997 | Johnson et al. |
| 5,685,543 A | 11/1997 | Garner et al. |
| 5,690,324 A | 11/1997 | Otomo et al. |
| 5,692,748 A | 12/1997 | Frisco et al. |
| 5,695,189 A | 12/1997 | Breeding et al. |
| 5,701,565 A | 12/1997 | Morgan |
| 5,707,286 A | 1/1998 | Carlson |
| 5,707,287 A | 1/1998 | McCrea et al. |
| 5,711,525 A | 1/1998 | Breeding et al. |
| 5,718,427 A | 2/1998 | Cranford et al. |
| 5,719,288 A | 2/1998 | Sens et al. |
| 5,720,484 A | 2/1998 | Hsu et al. |
| 5,722,893 A | 3/1998 | Hill et al. |
| 5,735,525 A | 4/1998 | McCrea et al. |
| 5,735,724 A | 4/1998 | Udagawa |
| 5,735,742 A | 4/1998 | French et al. |
| 5,743,798 A | 4/1998 | Adams et al. |
| 5,768,382 A | 6/1998 | Schneier et al. |
| 5,770,533 A | 6/1998 | Franchi et al. |
| 5,770,553 A | 6/1998 | Kroner et al. |
| 5,772,505 A | 6/1998 | Garczynski et al. |
| 5,779,546 A | 7/1998 | Meissner et al. |
| 5,781,647 A | 7/1998 | Fishbine et al. |
| 5,785,321 A | 7/1998 | Van Putten et al. |
| 5,788,574 A | 8/1998 | Ornstein et al. |
| 5,791,988 A | 8/1998 | Nomi et al. |
| 5,802,560 A | 9/1998 | Joseph et al. |
| 5,803,808 A | 9/1998 | Strisower |
| 5,810,355 A | 9/1998 | Trilli |
| 5,813,326 A | 9/1998 | Salomon et al. |
| 5,813,912 A | 9/1998 | Shultz et al. |
| 5,814,796 A | 9/1998 | Benson et al. |
| 5,836,775 A | 11/1998 | Hiyama et al. |
| 5,839,730 A | 11/1998 | Pike |
| 5,845,906 A | 12/1998 | Wirth et al. |
| 5,851,011 A | 12/1998 | Lott et al. |
| 5,867,586 A | 2/1999 | Liang |
| 5,879,233 A | 3/1999 | Stupero |
| 5,883,804 A | 3/1999 | Christensen |
| 5,890,717 A | 4/1999 | Rosewarne et al. |
| 5,892,210 A | 4/1999 | Levasseur |
| 5,911,626 A | 6/1999 | McCrea et al. |
| 5,919,090 A | 7/1999 | Mothwurf |
| 5,936,222 A | 8/1999 | Korsunsky et al. |
| 5,941,769 A | 8/1999 | Order |
| 5,944,310 A | 8/1999 | Johnson et al. |
| D414,527 S | 9/1999 | Tedham |
| 5,957,776 A | 9/1999 | Hoehne et al. |
| 5,974,150 A | 10/1999 | Kaish et al. |
| 5,985,305 A | 11/1999 | Peery et al. |
| 5,989,122 A | 11/1999 | Roblejo et al. |
| 5,991,308 A | 11/1999 | Fuhrmann et al. |
| 6,015,311 A | 1/2000 | Benjamin et al. |
| 6,019,368 A | 2/2000 | Sines et al. |
| 6,019,374 A | 2/2000 | Breeding et al. |
| 6,039,650 A | 3/2000 | Hill et al. |
| 6,050,569 A | 4/2000 | Taylor |
| 6,053,695 A | 4/2000 | Longoria et al. |
| 6,061,449 A | 5/2000 | Candelore et al. |
| 6,068,258 A | 5/2000 | Breeding et al. |
| 6,069,564 A | 5/2000 | Hatano et al. |
| 6,071,190 A | 6/2000 | Weiss et al. |
| 6,093,103 A | 7/2000 | McCrea et al. |
| 6,113,101 A | 9/2000 | Wirth et al. |
| 6,117,012 A | 9/2000 | McCrea et al. |
| D432,588 S | 10/2000 | Tedham |
| 6,126,166 A | 10/2000 | Lorson et al. |
| 6,127,447 A | 10/2000 | Mitry et al. |
| 6,131,817 A | 10/2000 | Miller |
| 6,139,014 A | 10/2000 | Breeding et al. |
| 6,149,154 A | 11/2000 | Grauzer et al. |
| 6,154,131 A | 11/2000 | Jones et al. |
| 6,165,069 A | 12/2000 | Sines et al. |
| 6,165,072 A | 12/2000 | Davis et al. |
| 6,183,362 B1 | 2/2001 | Boushy |
| 6,186,895 B1 | 2/2001 | Oliver |
| 6,200,218 B1 | 3/2001 | Lindsay |
| 6,210,274 B1 | 4/2001 | Carlson |
| 6,213,310 B1 | 4/2001 | Wennersten et al. |
| 6,217,447 B1 | 4/2001 | Lofink et al. |
| 6,234,900 B1 | 5/2001 | Cumbers |
| 6,236,223 B1 | 5/2001 | Brady et al. |
| 6,250,632 B1 | 6/2001 | Albrecht |
| 6,254,002 B1 | 7/2001 | Litman |

(56) References Cited

U.S. PATENT DOCUMENTS

| | | |
|---|---|---|
| 6,254,096 B1 | 7/2001 | Grauzer et al. |
| 6,254,484 B1 | 7/2001 | McCrea, Jr. |
| 6,257,981 B1 | 7/2001 | Acres et al. |
| 6,267,248 B1 | 7/2001 | Johnson et al. |
| 6,267,648 B1 | 7/2001 | Katayama et al. |
| 6,267,671 B1 | 7/2001 | Hogan |
| 6,270,404 B2 | 8/2001 | Sines et al. |
| 6,272,223 B1 | 8/2001 | Carlson |
| 6,293,546 B1 | 9/2001 | Hessing et al. |
| 6,293,864 B1 | 9/2001 | Romero |
| 6,299,167 B1 | 10/2001 | Sines et al. |
| 6,299,534 B1 | 10/2001 | Breeding et al. |
| 6,299,536 B1 | 10/2001 | Hill |
| 6,308,886 B1 | 10/2001 | Benson et al. |
| 6,313,871 B1 | 11/2001 | Schubert |
| 6,325,373 B1 | 12/2001 | Breeding et al. |
| 6,334,614 B1 | 1/2002 | Breeding |
| 6,341,778 B1 | 1/2002 | Lee |
| 6,342,830 B1 | 1/2002 | Want et al. |
| 6,346,044 B1 | 2/2002 | McCrea, Jr. |
| 6,361,044 B1 | 3/2002 | Block et al. |
| 6,386,973 B1 | 5/2002 | Yoseloff |
| 6,402,142 B1 | 6/2002 | Warren et al. |
| 6,403,908 B2 | 6/2002 | Stardust et al. |
| 6,443,839 B2 | 9/2002 | Stockdale |
| 6,446,864 B1 | 9/2002 | Kim et al. |
| 6,454,266 B1 | 9/2002 | Breeding et al. |
| 6,460,848 B1 | 10/2002 | Soltys et al. |
| 6,464,584 B2 | 10/2002 | Oliver |
| 6,490,277 B1 | 12/2002 | Tzotzkov |
| 6,508,709 B1 | 1/2003 | Karmarkar |
| 6,514,140 B1 | 2/2003 | Storch |
| 6,517,435 B2 | 2/2003 | Soltys et al. |
| 6,517,436 B2 | 2/2003 | Soltys et al. |
| 6,520,857 B2 | 2/2003 | Soltys et al. |
| 6,527,271 B2 | 3/2003 | Soltys et al. |
| 6,530,836 B2 | 3/2003 | Soltys et al. |
| 6,530,837 B2 | 3/2003 | Soltys et al. |
| 6,532,297 B1 | 3/2003 | Lindquist |
| 6,533,276 B2 | 3/2003 | Soltys et al. |
| 6,533,662 B2 | 3/2003 | Soltys et al. |
| 6,561,897 B1 | 5/2003 | Bourbour et al. |
| 6,568,678 B2 | 5/2003 | Breeding et al. |
| 6,579,180 B2 | 6/2003 | Soltys et al. |
| 6,579,181 B2 | 6/2003 | Soltys et al. |
| 6,581,747 B1 | 6/2003 | Charlier et al. |
| 6,582,301 B2 | 6/2003 | Hill |
| 6,582,302 B2 | 6/2003 | Romero |
| 6,585,586 B1 | 7/2003 | Romero |
| 6,585,588 B2 | 7/2003 | Hartl |
| 6,585,856 B2 | 7/2003 | Zwick et al. |
| 6,588,750 B1 | 7/2003 | Grauzer et al. |
| 6,588,751 B1 | 7/2003 | Grauzer et al. |
| 6,595,857 B2 | 7/2003 | Soltys et al. |
| 6,609,710 B1 | 8/2003 | Order |
| 6,612,928 B1 | 9/2003 | Bradford et al. |
| 6,616,535 B1 | 9/2003 | Nishizaki et al. |
| 6,619,662 B2 | 9/2003 | Miller |
| 6,622,185 B1 | 9/2003 | Johnson |
| 6,626,757 B2 | 9/2003 | Oliveras |
| 6,629,019 B2 | 9/2003 | Legge et al. |
| 6,629,591 B1 | 10/2003 | Griswold et al. |
| 6,629,889 B2 | 10/2003 | Mothwurf |
| 6,629,894 B2 | 10/2003 | Purton |
| 6,637,622 B1 | 10/2003 | Robinson |
| 6,638,161 B2 | 10/2003 | Soltys et al. |
| 6,645,068 B1 | 11/2003 | Kelly et al. |
| 6,645,077 B2 | 11/2003 | Rowe |
| 6,651,981 B2 | 11/2003 | Grauzer et al. |
| 6,651,982 B2 | 11/2003 | Grauzer et al. |
| 6,651,985 B2 | 11/2003 | Sines et al. |
| 6,652,379 B2 | 11/2003 | Soltys et al. |
| 6,655,684 B2 | 12/2003 | Grauzer et al. |
| 6,655,690 B1 | 12/2003 | Oskwarek |
| 6,658,135 B1 | 12/2003 | Morito et al. |
| 6,659,460 B2 | 12/2003 | Blaha et al. |
| 6,659,461 B2 | 12/2003 | Yoseloff et al. |
| 6,659,875 B2 | 12/2003 | Purton |
| 6,663,490 B2 | 12/2003 | Soltys et al. |
| 6,666,768 B1 | 12/2003 | Akers |
| 6,671,358 B1 | 12/2003 | Seidman et al. |
| 6,676,127 B2 | 1/2004 | Johnson et al. |
| 6,676,517 B2 | 1/2004 | Beavers |
| 6,680,843 B2 | 1/2004 | Farrow et al. |
| 6,685,564 B2 | 2/2004 | Oliver |
| 6,685,567 B2 | 2/2004 | Cockerille et al. |
| 6,685,568 B2 | 2/2004 | Soltys et al. |
| 6,688,597 B2 | 2/2004 | Jones |
| 6,688,979 B2 | 2/2004 | Soltys et al. |
| 6,690,673 B1 | 2/2004 | Jarvis |
| 6,698,756 B1 | 3/2004 | Baker et al. |
| 6,698,759 B2 | 3/2004 | Webb et al. |
| 6,702,289 B1 | 3/2004 | Feola |
| 6,702,290 B2 | 3/2004 | Buono-Correa et al. |
| 6,709,333 B1 | 3/2004 | Bradford et al. |
| 6,712,696 B2 | 3/2004 | Soltys et al. |
| 6,719,288 B2 | 4/2004 | Hessing et al. |
| 6,719,634 B2 | 4/2004 | Mishina et al. |
| 6,722,974 B2 | 4/2004 | Sines et al. |
| 6,726,205 B2 | 4/2004 | Purton |
| 6,732,067 B1 | 5/2004 | Powderly |
| 6,733,012 B2 | 5/2004 | Bui et al. |
| 6,733,388 B2 | 5/2004 | Mothwurf |
| 6,746,333 B1 | 6/2004 | Onda et al. |
| 6,747,560 B2 | 6/2004 | Stevens, III |
| 6,749,510 B2 | 6/2004 | Giobbi |
| 6,758,751 B2 | 7/2004 | Soltys et al. |
| 6,758,757 B2 | 7/2004 | Luciano, Jr. et al. |
| 6,769,693 B2 | 8/2004 | Huard et al. |
| 6,774,782 B2 | 8/2004 | Runyon et al. |
| 6,789,801 B2 | 9/2004 | Snow |
| 6,802,510 B1 | 10/2004 | Haber |
| 6,804,763 B1 | 10/2004 | Stockdale et al. |
| 6,808,173 B2 | 10/2004 | Snow |
| 6,827,282 B2 | 12/2004 | Silverbrook |
| 6,834,251 B1 | 12/2004 | Fletcher |
| 6,840,517 B2 | 1/2005 | Snow |
| 6,842,263 B1 | 1/2005 | Saeki |
| 6,843,725 B2 | 1/2005 | Nelson |
| 6,848,616 B2 | 2/2005 | Tsirline et al. |
| 6,848,844 B2 | 2/2005 | McCue, Jr. et al. |
| 6,848,994 B1 | 2/2005 | Knust et al. |
| 6,857,961 B2 | 2/2005 | Soltys et al. |
| 6,874,784 B1 | 4/2005 | Promutico |
| 6,874,786 B2 | 4/2005 | Bruno |
| 6,877,657 B2 | 4/2005 | Ranard et al. |
| 6,877,748 B1 | 4/2005 | Patroni |
| 6,886,829 B2 | 5/2005 | Hessing et al. |
| 6,889,979 B2 | 5/2005 | Blaha et al. |
| 6,893,347 B1 | 5/2005 | Zilliacus et al. |
| 6,899,628 B2 | 5/2005 | Leen et al. |
| 6,902,167 B2 | 6/2005 | Webb |
| 6,905,121 B1 | 6/2005 | Timpano |
| 6,923,446 B2 | 8/2005 | Snow |
| 6,938,900 B2 | 9/2005 | Snow |
| 6,941,180 B1 | 9/2005 | Fischer et al. |
| 6,950,948 B2 | 9/2005 | Neff |
| 6,955,599 B2 | 10/2005 | Bourbour et al. |
| 6,957,746 B2 | 10/2005 | Martin et al. |
| 6,959,925 B1 | 11/2005 | Baker et al. |
| 6,959,935 B2 | 11/2005 | Buhl et al. |
| 6,960,134 B2 | 11/2005 | Hartl et al. |
| 6,964,612 B2 | 11/2005 | Soltys et al. |
| 6,986,514 B2 | 1/2006 | Snow |
| 6,988,516 B2 | 1/2006 | Debaes et al. |
| 7,011,309 B2 | 3/2006 | Soltys et al. |
| 7,020,307 B2 | 3/2006 | Hinton et al. |
| 7,028,598 B2 | 4/2006 | Teshima |
| 7,029,009 B2 | 4/2006 | Grauzer et al. |
| 7,036,818 B2 | 5/2006 | Grauzer et al. |
| 7,046,458 B2 | 5/2006 | Nakayama |
| 7,046,764 B1 | 5/2006 | Kump |
| 7,048,629 B2 | 5/2006 | Sines et al. |
| 7,059,602 B2 | 6/2006 | Grauzer et al. |

(56) References Cited

U.S. PATENT DOCUMENTS

| | | |
|---|---|---|
| 7,066,464 B2 | 6/2006 | Blad et al. |
| 7,068,822 B2 | 6/2006 | Scott |
| 7,073,791 B2 | 7/2006 | Grauzer et al. |
| 7,084,769 B2 | 8/2006 | Bauer et al. |
| 7,089,420 B1 | 8/2006 | Durst et al. |
| 7,106,201 B2 | 9/2006 | Tuttle |
| 7,113,094 B2 | 9/2006 | Garber et al. |
| 7,114,718 B2 | 10/2006 | Grauzer et al. |
| 7,124,947 B2 | 10/2006 | Storch |
| 7,128,652 B1 | 10/2006 | Lavoie et al. |
| 7,137,627 B2 | 11/2006 | Grauzer et al. |
| 7,139,108 B2 | 11/2006 | Andersen et al. |
| 7,140,614 B2 | 11/2006 | Snow |
| 7,162,035 B1 | 1/2007 | Durst et al. |
| 7,165,769 B2 | 1/2007 | Crenshaw et al. |
| 7,165,770 B2 | 1/2007 | Snow |
| 7,175,522 B2 | 2/2007 | Hartl |
| 7,186,181 B2 | 3/2007 | Rowe |
| 7,201,656 B2 | 4/2007 | Darder |
| 7,202,888 B2 | 4/2007 | Tecu et al. |
| 7,203,841 B2 | 4/2007 | Jackson et al. |
| 7,213,812 B2 | 5/2007 | Schubert et al. |
| 7,222,852 B2 | 5/2007 | Soltys et al. |
| 7,222,855 B2 | 5/2007 | Sorge |
| 7,231,812 B1 | 6/2007 | Lagare |
| 7,234,698 B2 | 6/2007 | Grauzer et al. |
| 7,237,969 B2 | 7/2007 | Bartman |
| 7,243,148 B2 | 7/2007 | Keir et al. |
| 7,243,698 B2 | 7/2007 | Siegel |
| 7,246,799 B2 | 7/2007 | Snow |
| 7,255,344 B2 | 8/2007 | Grauzer et al. |
| 7,255,351 B2 | 8/2007 | Yoseloff et al. |
| 7,255,642 B2 | 8/2007 | Sines et al. |
| 7,257,630 B2 | 8/2007 | Cole et al. |
| 7,261,294 B2 | 8/2007 | Grauzer et al. |
| 7,264,241 B2 | 9/2007 | Schubert et al. |
| 7,264,243 B2 | 9/2007 | Yoseloff et al. |
| 7,277,570 B2 | 10/2007 | Armstrong |
| 7,278,923 B2 | 10/2007 | Grauzer et al. |
| 7,294,056 B2 | 11/2007 | Lowell et al. |
| 7,297,062 B2 | 11/2007 | Gatto et al. |
| 7,300,056 B2 | 11/2007 | Gioia et al. |
| 7,303,473 B2 | 12/2007 | Rowe |
| 7,309,065 B2 | 12/2007 | Yoseloff et al. |
| 7,316,609 B2 | 1/2008 | Dunn et al. |
| 7,316,615 B2 | 1/2008 | Soltys et al. |
| 7,322,576 B2 | 1/2008 | Grauzer et al. |
| 7,331,579 B2 | 2/2008 | Snow |
| 7,334,794 B2 | 2/2008 | Snow |
| 7,338,044 B2 | 3/2008 | Grauzer et al. |
| 7,338,362 B1 | 3/2008 | Gallagher |
| 7,341,510 B2 | 3/2008 | Bourbour et al. |
| 7,357,321 B2 | 4/2008 | Yoshida et al. |
| 7,360,094 B2 | 4/2008 | Neff |
| 7,367,561 B2 | 5/2008 | Blaha et al. |
| 7,367,563 B2 | 5/2008 | Yoseloff et al. |
| 7,367,884 B2 | 5/2008 | Breeding et al. |
| 7,374,170 B2 | 5/2008 | Grauzer et al. |
| 7,384,044 B2 | 6/2008 | Grauzer et al. |
| 7,387,300 B2 | 6/2008 | Snow |
| 7,389,990 B2 | 6/2008 | Mourad |
| 7,390,256 B2 | 6/2008 | Soltys et al. |
| 7,399,226 B2 | 7/2008 | Mishra |
| 7,407,438 B2 | 8/2008 | Schubert et al. |
| 7,413,191 B2 | 8/2008 | Grauzer et al. |
| 7,434,805 B2 | 10/2008 | Grauzer et al. |
| 7,436,957 B1 | 10/2008 | Fischer et al. |
| 7,448,626 B2 | 11/2008 | Fleckenstein |
| 7,458,582 B2 | 12/2008 | Snow et al. |
| 7,461,843 B1 | 12/2008 | Baker et al. |
| 7,464,932 B2 | 12/2008 | Darling |
| 7,464,934 B2 | 12/2008 | Schwartz |
| 7,472,906 B2 | 1/2009 | Shai |
| 7,500,672 B2 | 3/2009 | Ho |
| 7,506,874 B2 | 3/2009 | Hall |
| 7,510,186 B2 | 3/2009 | Fleckenstein |
| 7,510,190 B2 | 3/2009 | Snow et al. |
| 7,510,194 B2 | 3/2009 | Soltys et al. |
| 7,510,478 B2 | 3/2009 | Benbrahim et al. |
| 7,513,437 B2 | 4/2009 | Douglas |
| 7,515,718 B2 | 4/2009 | Nguyen et al. |
| 7,523,935 B2 | 4/2009 | Grauzer et al. |
| 7,523,936 B2 | 4/2009 | Grauzer et al. |
| 7,523,937 B2 | 4/2009 | Fleckenstein |
| 7,525,510 B2 | 4/2009 | Beland et al. |
| 7,537,216 B2 | 5/2009 | Soltys et al. |
| 7,540,497 B2 | 6/2009 | Tseng |
| 7,540,498 B2 | 6/2009 | Crenshaw et al. |
| 7,549,643 B2 | 6/2009 | Quach |
| 7,554,753 B2 | 6/2009 | Wakamiya |
| 7,556,197 B2 | 7/2009 | Yoshida et al. |
| 7,556,266 B2 | 7/2009 | Blaha et al. |
| 7,575,237 B2 | 8/2009 | Snow |
| 7,578,506 B2 | 8/2009 | Lambert |
| 7,584,962 B2 | 9/2009 | Breeding et al. |
| 7,584,963 B2 | 9/2009 | Krenn et al. |
| 7,584,966 B2 | 9/2009 | Snow |
| 7,591,728 B2 | 9/2009 | Gioia et al. |
| 7,593,544 B2 | 9/2009 | Downs, III et al. |
| 7,594,660 B2 | 9/2009 | Baker et al. |
| 7,597,623 B2 | 10/2009 | Grauzer et al. |
| 7,644,923 B1 | 1/2010 | Dickinson et al. |
| 7,661,676 B2 | 2/2010 | Smith et al. |
| 7,666,090 B2 | 2/2010 | Hettinger |
| 7,669,852 B2 | 3/2010 | Baker et al. |
| 7,669,853 B2 | 3/2010 | Jones |
| 7,677,565 B2 | 3/2010 | Grauzer et al. |
| 7,677,566 B2 | 3/2010 | Krenn et al. |
| 7,686,681 B2 | 3/2010 | Soltys et al. |
| 7,699,694 B2 | 4/2010 | Hill |
| 7,735,657 B2 | 6/2010 | Johnson |
| 7,740,244 B2 | 6/2010 | Ho |
| 7,744,452 B2 | 6/2010 | Cimring et al. |
| 7,753,373 B2 | 7/2010 | Grauzer et al. |
| 7,753,374 B2 | 7/2010 | Ho |
| 7,753,798 B2 | 7/2010 | Soltys et al. |
| 7,762,554 B2 | 7/2010 | Ho |
| 7,764,836 B2 | 7/2010 | Downs, III et al. |
| 7,766,332 B2 | 8/2010 | Grauzer et al. |
| 7,766,333 B1 | 8/2010 | Stardust et al. |
| 7,769,232 B2 | 8/2010 | Downs, III |
| 7,769,853 B2 | 8/2010 | Nezamzadeh |
| 7,773,749 B1 | 8/2010 | Durst et al. |
| 7,780,529 B2 | 8/2010 | Rowe et al. |
| 7,784,790 B2 | 8/2010 | Grauzer et al. |
| 7,804,982 B2 | 9/2010 | Howard et al. |
| 7,846,020 B2 | 12/2010 | Walker et al. |
| 7,867,080 B2 | 1/2011 | Nicely et al. |
| 7,890,365 B2 | 2/2011 | Hettinger |
| 7,900,923 B2 | 3/2011 | Toyama et al. |
| 7,901,285 B2 | 3/2011 | Tran et al. |
| 7,908,169 B2 | 3/2011 | Hettinger |
| 7,909,689 B2 | 3/2011 | Lardie |
| 7,931,533 B2 | 4/2011 | LeMay et al. |
| 7,933,448 B2 | 4/2011 | Downs, III |
| 7,946,586 B2 | 5/2011 | Krenn et al. |
| 7,967,294 B2 | 6/2011 | Blaha et al. |
| 7,976,023 B1 | 7/2011 | Hessing et al. |
| 7,988,152 B2 | 8/2011 | Sines |
| 7,988,554 B2 | 8/2011 | LeMay et al. |
| 7,995,196 B1 | 8/2011 | Fraser |
| 8,002,638 B2 | 8/2011 | Grauzer et al. |
| 8,011,661 B2 | 9/2011 | Stasson |
| 8,016,663 B2 | 9/2011 | Soltys et al. |
| 8,021,231 B2 | 9/2011 | Walker et al. |
| 8,025,294 B2 | 9/2011 | Grauzer et al. |
| 8,038,521 B2 | 10/2011 | Grauzer et al. |
| RE42,944 E | 11/2011 | Blaha et al. |
| 8,057,302 B2 | 11/2011 | Wells et al. |
| 8,062,134 B2 | 11/2011 | Kelly et al. |
| 8,070,574 B2 | 12/2011 | Grauzer et al. |
| 8,092,307 B2 | 1/2012 | Kelly |
| 8,092,309 B2 | 1/2012 | Bickley |
| 8,141,875 B2 | 3/2012 | Grauzer et al. |

(56) References Cited

U.S. PATENT DOCUMENTS

| | | | |
|---|---|---|---|
| 8,150,158 B2 | 4/2012 | Downs, III |
| 8,171,567 B1 | 5/2012 | Fraser et al. |
| 8,210,536 B2 | 7/2012 | Blaha et al. |
| 8,221,244 B2 | 7/2012 | French |
| 8,251,293 B2 | 8/2012 | Nagata et al. |
| 8,267,404 B2 | 9/2012 | Grauzer et al. |
| 8,270,603 B1 | 9/2012 | Durst et al. |
| 8,287,347 B2 | 10/2012 | Snow et al. |
| 8,287,386 B2 | 10/2012 | Miller et al. |
| 8,319,666 B2 | 11/2012 | Weinmann et al. |
| 8,337,296 B2 | 12/2012 | Grauzer et al. |
| 8,342,525 B2 | 1/2013 | Scheper et al. |
| 8,342,526 B1 | 1/2013 | Sampson et al. |
| 8,342,529 B2 | 1/2013 | Snow |
| 8,353,513 B2 | 1/2013 | Swanson |
| 8,381,918 B2 | 2/2013 | Johnson |
| 8,419,521 B2 | 4/2013 | Grauzer et al. |
| 8,444,147 B2 | 5/2013 | Grauzer et al. |
| 8,469,360 B2 | 6/2013 | Sines |
| 8,480,088 B2 | 7/2013 | Toyama et al. |
| 8,485,527 B2 | 7/2013 | Sampson et al. |
| 8,490,973 B2 | 7/2013 | Yoseloff et al. |
| 8,498,444 B2 | 7/2013 | Sharma |
| 8,505,916 B2 | 8/2013 | Grauzer et al. |
| 8,511,684 B2 | 8/2013 | Grauzer et al. |
| 8,556,263 B2 | 10/2013 | Grauzer et al. |
| 8,579,289 B2 | 11/2013 | Rynda et al. |
| 8,616,552 B2 | 12/2013 | Czyzewski et al. |
| 8,628,086 B2 | 1/2014 | Krenn et al. |
| 8,662,500 B2 | 3/2014 | Swanson |
| 8,695,978 B1 | 4/2014 | Ho |
| 8,702,100 B2 | 4/2014 | Snow et al. |
| 8,702,101 B2 | 4/2014 | Scheper et al. |
| 8,720,891 B2 | 5/2014 | Hessing et al. |
| 8,758,111 B2 | 6/2014 | Lutnick |
| 8,777,710 B2 | 7/2014 | Grauzer et al. |
| 8,820,745 B2 | 9/2014 | Grauzer et al. |
| 8,899,587 B2 | 12/2014 | Grauzer et al. |
| 8,919,775 B2 | 12/2014 | Wadds et al. |
| 2001/0036231 A1 | 11/2001 | Easwar et al. |
| 2001/0036866 A1 | 11/2001 | Stockdale et al. |
| 2002/0017481 A1 | 2/2002 | Johnson et al. |
| 2002/0030425 A1 | 3/2002 | Tiramani et al. |
| 2002/0045478 A1 | 4/2002 | Soltys et al. |
| 2002/0045481 A1 | 4/2002 | Soltys et al. |
| 2002/0063389 A1 | 5/2002 | Breeding et al. |
| 2002/0068635 A1 | 6/2002 | Hill |
| 2002/0070499 A1 | 6/2002 | Breeding et al. |
| 2002/0094869 A1 | 7/2002 | Harkham |
| 2002/0107067 A1 | 8/2002 | McGlone et al. |
| 2002/0107072 A1 | 8/2002 | Giobbi |
| 2002/0113368 A1 | 8/2002 | Hessing et al. |
| 2002/0135692 A1 | 9/2002 | Fujinawa |
| 2002/0142820 A1 | 10/2002 | Bartlett |
| 2002/0155869 A1 | 10/2002 | Soltys et al. |
| 2002/0163125 A1 | 11/2002 | Grauzer et al. |
| 2002/0187821 A1 | 12/2002 | Soltys et al. |
| 2002/0187830 A1 | 12/2002 | Stockdale et al. |
| 2003/0003997 A1 | 1/2003 | Vuong et al. |
| 2003/0007143 A1 | 1/2003 | McArthur et al. |
| 2003/0047870 A1 | 3/2003 | Blaha et al. |
| 2003/0048476 A1 | 3/2003 | Yamakawa |
| 2003/0052449 A1 | 3/2003 | Grauzer et al. |
| 2003/0052450 A1 | 3/2003 | Grauzer et al. |
| 2003/0064798 A1 | 4/2003 | Grauzer et al. |
| 2003/0067112 A1 | 4/2003 | Grauzer et al. |
| 2003/0071413 A1 | 4/2003 | Blaha et al. |
| 2003/0073498 A1 | 4/2003 | Grauzer et al. |
| 2003/0075865 A1 | 4/2003 | Grauzer et al. |
| 2003/0075866 A1 | 4/2003 | Blaha et al. |
| 2003/0087694 A1 | 5/2003 | Storch |
| 2003/0090059 A1 | 5/2003 | Grauzer et al. |
| 2003/0094756 A1 | 5/2003 | Grauzer et al. |
| 2003/0151194 A1 | 8/2003 | Hessing et al. |
| 2003/0195025 A1 | 10/2003 | Hill |
| 2004/0015423 A1 | 1/2004 | Walker et al. |
| 2004/0036214 A1 | 2/2004 | Baker et al. |
| 2004/0067789 A1 | 4/2004 | Grauzer et al. |
| 2004/0100026 A1 | 5/2004 | Haggard |
| 2004/0108654 A1 | 6/2004 | Grauzer et al. |
| 2004/0116179 A1 | 6/2004 | Nicely et al. |
| 2004/0169332 A1 | 9/2004 | Grauzer et al. |
| 2004/0180722 A1 | 9/2004 | Giobbi |
| 2004/0224777 A1 | 11/2004 | Smith et al. |
| 2004/0245720 A1 | 12/2004 | Grauzer et al. |
| 2004/0259618 A1 | 12/2004 | Soltys et al. |
| 2005/0012671 A1 | 1/2005 | Bisig |
| 2005/0023752 A1 | 2/2005 | Grauzer et al. |
| 2005/0026680 A1 | 2/2005 | Gururajan |
| 2005/0035548 A1 | 2/2005 | Yoseloff et al. |
| 2005/0037843 A1 | 2/2005 | Wells et al. |
| 2005/0040594 A1 | 2/2005 | Krenn et al. |
| 2005/0051955 A1 | 3/2005 | Schubert et al. |
| 2005/0051956 A1 | 3/2005 | Grauzer et al. |
| 2005/0062227 A1 | 3/2005 | Grauzer et al. |
| 2005/0062228 A1 | 3/2005 | Grauzer et al. |
| 2005/0062229 A1 | 3/2005 | Grauzer et al. |
| 2005/0082750 A1 | 4/2005 | Grauzer et al. |
| 2005/0093231 A1 | 5/2005 | Grauzer et al. |
| 2005/0104289 A1 | 5/2005 | Grauzer et al. |
| 2005/0104290 A1 | 5/2005 | Grauzer et al. |
| 2005/0110210 A1 | 5/2005 | Soltys et al. |
| 2005/0113166 A1 | 5/2005 | Grauzer et al. |
| 2005/0113171 A1 | 5/2005 | Hodgson |
| 2005/0119048 A1 | 6/2005 | Soltys et al. |
| 2005/0137005 A1 | 6/2005 | Soltys et al. |
| 2005/0140090 A1 | 6/2005 | Breeding et al. |
| 2005/0146093 A1 | 7/2005 | Grauzer et al. |
| 2005/0148391 A1 | 7/2005 | Tain |
| 2005/0192092 A1 | 9/2005 | Breckner et al. |
| 2005/0206077 A1 | 9/2005 | Grauzer et al. |
| 2005/0242500 A1 | 11/2005 | Downs |
| 2005/0272501 A1 | 12/2005 | Tran et al. |
| 2005/0288083 A1 | 12/2005 | Downs |
| 2005/0288086 A1 | 12/2005 | Schubert et al. |
| 2006/0027970 A1 | 2/2006 | Kyrychenko |
| 2006/0033269 A1 | 2/2006 | Grauzer et al. |
| 2006/0033270 A1 | 2/2006 | Grauzer et al. |
| 2006/0046853 A1 | 3/2006 | Black |
| 2006/0063577 A1 | 3/2006 | Downs et al. |
| 2006/0066048 A1 | 3/2006 | Krenn et al. |
| 2006/0181022 A1 | 8/2006 | Grauzer et al. |
| 2006/0183540 A1 | 8/2006 | Grauzer et al. |
| 2006/0189381 A1 | 8/2006 | Daniel et al. |
| 2006/0199649 A1 | 9/2006 | Soltys et al. |
| 2006/0205508 A1 | 9/2006 | Green |
| 2006/0220312 A1 | 10/2006 | Baker et al. |
| 2006/0220313 A1 | 10/2006 | Baker et al. |
| 2006/0252521 A1 | 11/2006 | Gururajan et al. |
| 2006/0252554 A1 | 11/2006 | Gururajan et al. |
| 2006/0279040 A1 | 12/2006 | Downs et al. |
| 2006/0281534 A1 | 12/2006 | Grauzer et al. |
| 2007/0001395 A1 | 1/2007 | Gioia et al. |
| 2007/0006708 A1 | 1/2007 | Laakso |
| 2007/0015583 A1 | 1/2007 | Tran |
| 2007/0018389 A1 | 1/2007 | Downs |
| 2007/0045959 A1 | 3/2007 | Soltys |
| 2007/0049368 A1 | 3/2007 | Kuhn et al. |
| 2007/0057469 A1 | 3/2007 | Grauzer et al. |
| 2007/0066387 A1 | 3/2007 | Matsuno et al. |
| 2007/0069462 A1 | 3/2007 | Downs et al. |
| 2007/0072677 A1 | 3/2007 | Lavoie et al. |
| 2007/0102879 A1 | 5/2007 | Stasson |
| 2007/0111773 A1 | 5/2007 | Gururajan et al. |
| 2007/0184905 A1 | 8/2007 | Gatto et al. |
| 2007/0197294 A1 | 8/2007 | Gong |
| 2007/0197298 A1 | 8/2007 | Rowe |
| 2007/0202941 A1 | 8/2007 | Miltenberger et al. |
| 2007/0222147 A1 | 9/2007 | Blaha et al. |
| 2007/0225055 A1 | 9/2007 | Weisman |
| 2007/0233567 A1 | 10/2007 | Daly |
| 2007/0238506 A1 | 10/2007 | Ruckle |
| 2007/0259709 A1 | 11/2007 | Kelly et al. |
| 2007/0267812 A1 | 11/2007 | Grauzer et al. |

(56) References Cited

U.S. PATENT DOCUMENTS

| | | |
|---|---|---|
| 2007/0272600 A1 | 11/2007 | Johnson |
| 2007/0278739 A1 | 12/2007 | Swanson |
| 2007/0290438 A1 | 12/2007 | Grauzer et al. |
| 2008/0006997 A1 | 1/2008 | Scheper et al. |
| 2008/0006998 A1 | 1/2008 | Grauzer et al. |
| 2008/0022415 A1 | 1/2008 | Kuo et al. |
| 2008/0032763 A1 | 2/2008 | Giobbi |
| 2008/0039192 A1 | 2/2008 | Laut |
| 2008/0039208 A1 | 2/2008 | Abrink et al. |
| 2008/0096656 A1 | 4/2008 | LeMay et al. |
| 2008/0111300 A1 | 5/2008 | Czyzewski et al. |
| 2008/0113700 A1 | 5/2008 | Czyzewski et al. |
| 2008/0113783 A1 | 5/2008 | Czyzewski et al. |
| 2008/0136108 A1 | 6/2008 | Polay |
| 2008/0143048 A1 | 6/2008 | Shigeta |
| 2008/0176627 A1 | 7/2008 | Lardie |
| 2008/0217218 A1 | 9/2008 | Johnson |
| 2008/0234046 A1 | 9/2008 | Kinsley |
| 2008/0234047 A1 | 9/2008 | Nguyen |
| 2008/0248875 A1 | 10/2008 | Beatty |
| 2008/0284096 A1 | 11/2008 | Toyama et al. |
| 2008/0303210 A1 | 12/2008 | Grauzer et al. |
| 2008/0315517 A1 | 12/2008 | Toyama |
| 2009/0026700 A2 | 1/2009 | Shigeta |
| 2009/0048026 A1 | 2/2009 | French |
| 2009/0054161 A1 | 2/2009 | Schubert et al. |
| 2009/0072477 A1 | 3/2009 | Tseng |
| 2009/0091078 A1 | 4/2009 | Grauzer et al. |
| 2009/0100409 A1 | 4/2009 | Toneguzzo |
| 2009/0104963 A1 | 4/2009 | Burman et al. |
| 2009/0121429 A1 | 5/2009 | Walsh |
| 2009/0140492 A1 | 6/2009 | Yoseloff et al. |
| 2009/0166970 A1 | 7/2009 | Rosh |
| 2009/0176547 A1 | 7/2009 | Katz |
| 2009/0179378 A1 | 7/2009 | Amaitis et al. |
| 2009/0186676 A1 | 7/2009 | Amaitis et al. |
| 2009/0189346 A1 | 7/2009 | Krenn et al. |
| 2009/0191933 A1 | 7/2009 | French |
| 2009/0194988 A1 | 8/2009 | Wright et al. |
| 2009/0197662 A1 | 8/2009 | Wright et al. |
| 2009/0224476 A1 | 9/2009 | Grauzer et al. |
| 2009/0227318 A1 | 9/2009 | Wright et al. |
| 2009/0227360 A1 | 9/2009 | Gioia et al. |
| 2009/0250873 A1 | 10/2009 | Jones |
| 2009/0253478 A1 | 10/2009 | Walker et al. |
| 2009/0253503 A1 | 10/2009 | Krise et al. |
| 2009/0267296 A1 | 10/2009 | Ho |
| 2009/0267297 A1 | 10/2009 | Blaha et al. |
| 2009/0283969 A1 | 11/2009 | Tseng |
| 2009/0298577 A1 | 12/2009 | Gagner et al. |
| 2009/0302535 A1 | 12/2009 | Ho |
| 2009/0302537 A1 | 12/2009 | Ho |
| 2009/0312093 A1 | 12/2009 | Walker et al. |
| 2009/0314188 A1 | 12/2009 | Toyama et al. |
| 2010/0013152 A1 | 1/2010 | Grauzer et al. |
| 2010/0038849 A1 | 2/2010 | Scheper et al. |
| 2010/0048304 A1 | 2/2010 | Boesen |
| 2010/0069155 A1 | 3/2010 | Schwartz et al. |
| 2010/0178987 A1 | 7/2010 | Pacey |
| 2010/0197410 A1 | 8/2010 | Leen et al. |
| 2010/0234110 A1 | 9/2010 | Clarkson |
| 2010/0240440 A1 | 9/2010 | Szrek et al. |
| 2010/0244376 A1 | 9/2010 | Johnson |
| 2010/0244382 A1 | 9/2010 | Snow |
| 2010/0252992 A1 | 10/2010 | Sines |
| 2010/0255899 A1 | 10/2010 | Paulsen |
| 2010/0276880 A1 | 11/2010 | Grauzer et al. |
| 2010/0311493 A1 | 12/2010 | Miller et al. |
| 2010/0311494 A1 | 12/2010 | Miller et al. |
| 2010/0314830 A1 | 12/2010 | Grauzer et al. |
| 2010/0320685 A1 | 12/2010 | Grauzer et al. |
| 2011/0006480 A1 | 1/2011 | Grauzer et al. |
| 2011/0012303 A1 | 1/2011 | Kourgiantakis et al. |
| 2011/0024981 A1 | 2/2011 | Tseng |
| 2011/0052049 A1 | 3/2011 | Rajaraman et al. |
| 2011/0062662 A1 | 3/2011 | Ohta et al. |
| 2011/0078096 A1 | 3/2011 | Bounds |
| 2011/0105208 A1 | 5/2011 | Bickley |
| 2011/0109042 A1 | 5/2011 | Rynda et al. |
| 2011/0130185 A1 | 6/2011 | Walker |
| 2011/0130190 A1 | 6/2011 | Hamman et al. |
| 2011/0159952 A1 | 6/2011 | Kerr |
| 2011/0159953 A1 | 6/2011 | Kerr |
| 2011/0165936 A1 | 7/2011 | Kerr |
| 2011/0172008 A1 | 7/2011 | Alderucci |
| 2011/0183748 A1 | 7/2011 | Wilson et al. |
| 2011/0230268 A1 | 9/2011 | Williams |
| 2011/0269529 A1 | 11/2011 | Baerlocher |
| 2011/0272881 A1 | 11/2011 | Sines |
| 2011/0285081 A1 | 11/2011 | Stasson |
| 2011/0287829 A1 | 11/2011 | Clarkson et al. |
| 2012/0015724 A1 | 1/2012 | Ocko et al. |
| 2012/0015725 A1 | 1/2012 | Ocko et al. |
| 2012/0015743 A1 | 1/2012 | Lam et al. |
| 2012/0015747 A1 | 1/2012 | Ocko et al. |
| 2012/0021835 A1 | 1/2012 | Keller et al. |
| 2012/0034977 A1 | 2/2012 | Kammler |
| 2012/0062745 A1 | 3/2012 | Han et al. |
| 2012/0074646 A1 | 3/2012 | Grauzer et al. |
| 2012/0091656 A1 | 4/2012 | Blaha et al. |
| 2012/0095982 A1 | 4/2012 | Lennington et al. |
| 2012/0161393 A1 | 6/2012 | Krenn et al. |
| 2012/0175841 A1 | 7/2012 | Grauzer et al. |
| 2012/0181747 A1 | 7/2012 | Grauzer et al. |
| 2012/0187625 A1 | 7/2012 | Downs, III et al. |
| 2012/0242782 A1 | 9/2012 | Huang |
| 2012/0286471 A1 | 11/2012 | Grauzer et al. |
| 2012/0306152 A1 | 12/2012 | Krishnamurty et al. |
| 2013/0020761 A1 | 1/2013 | Sines et al. |
| 2013/0085638 A1 | 4/2013 | Weinmann et al. |
| 2013/0099448 A1 | 4/2013 | Scheper et al. |
| 2013/0109455 A1 | 5/2013 | Grauzer et al. |
| 2013/0132306 A1 | 5/2013 | Kami et al. |
| 2013/0228972 A1 | 9/2013 | Grauzer et al. |
| 2013/0300059 A1 | 11/2013 | Sampson et al. |
| 2013/0337922 A1 | 12/2013 | Kuhn et al. |
| 2014/0027979 A1 | 1/2014 | Stasson et al. |
| 2014/0094239 A1 | 4/2014 | Grauzer et al. |
| 2014/0103606 A1 | 4/2014 | Grauzer et al. |
| 2014/0138907 A1 | 5/2014 | Rynda et al. |
| 2014/0145399 A1 | 5/2014 | Krenn et al. |
| 2014/0171170 A1 | 6/2014 | Krishnamurty et al. |
| 2014/0175724 A1 | 6/2014 | Huhtala et al. |
| 2014/0183818 A1 | 7/2014 | Czyzewski et al. |

FOREIGN PATENT DOCUMENTS

| | | |
|---|---|---|
| CA | 2266555 A1 | 4/1998 |
| CA | 2284017 A1 | 9/1998 |
| CA | 2612138 A1 | 12/2006 |
| CN | 101127131 A | 2/2008 |
| CN | 201139926 Y | 10/2008 |
| CZ | 24952 U1 | 2/2013 |
| DE | 672616 C | 3/1939 |
| DE | 2757341 A1 | 6/1978 |
| DE | 3807127 A1 | 9/1989 |
| EP | 0 777 514 | 2/2000 |
| EP | 1194888 A1 | 4/2002 |
| EP | 1502631 A1 | 2/2005 |
| EP | 1713026 A1 | 10/2006 |
| EP | 1575261 B1 | 8/2012 |
| FR | 2375918 A1 | 7/1978 |
| GB | 337147 A | 10/1930 |
| GB | 414014 A | 7/1934 |
| JP | 10063933 A | 3/1998 |
| JP | 11045321 A | 2/1999 |
| JP | 2000251031 A | 9/2000 |
| JP | 2001327647 A | 11/2001 |
| JP | 2002-165916 | 6/2002 |
| JP | 2003250950 A | 9/2003 |
| JP | 2005198668 A | 7/2005 |
| JP | 2008246061 A | 10/2008 |
| WO | 87/00764 | 2/1987 |
| WO | 9221413 A1 | 12/1992 |

(56) References Cited

FOREIGN PATENT DOCUMENTS

| | | | |
|---|---|---|---|
| WO | 9528210 A1 | 10/1995 | |
| WO | 9607153 A1 | 3/1996 | |
| WO | 9710577 A1 | 3/1997 | |
| WO | 98/14249 | 4/1998 | |
| WO | 98/40136 | 9/1998 | |
| WO | 9943404 A1 | 9/1999 | |
| WO | 99/52611 | 10/1999 | |
| WO | 9952610 A1 | 10/1999 | |
| WO | 00/51076 | 8/2000 | |
| WO | 0156670 A1 | 8/2001 | |
| WO | 0205914 A1 | 1/2002 | |
| WO | 2004067889 A1 | 8/2004 | |
| WO | 2004112923 A1 | 12/2004 | |
| WO | 2006/031472 | 3/2006 | |
| WO | 2006039308 A2 | 4/2006 | |
| WO | 2008005286 A2 | 1/2008 | |
| WO | 2008006023 A2 | 1/2008 | |
| WO | 2008091809 A2 | 7/2008 | |
| WO | 2009137541 A2 | 11/2009 | |
| WO | 2010001032 A1 | 1/2010 | |
| WO | 2010055328 A1 | 5/2010 | |
| WO | 2010117446 A1 | 10/2010 | |
| WO | 2013019677 A1 | 2/2013 | |

OTHER PUBLICATIONS

International Search Report for International Application No. PCT/US2003/015393, mailed Oct. 6, 2003.
Specification of Australian Patent Application No. Not listed, filed Aug. 15, 1994, Applicants: Rodney G. Johnson et al., Title: Card Handling Apparatus.
Specification of Australian Patent Application No. 31577/95, filed Jan. 17, 1995, Applicants: Rodney G. Johnson et al., Title: Card Handling Apparatus.
DVD Labeled "Luciano Decl. Ex. K". This is the video taped live Declaration of Mr. Luciano (see list of patents on the 1449 or of record in the file history) taken during preparation of litigation (Oct. 23, 2003). DVD sent to Examiner by US Postal Service with this PTO/SB/08 form.
DVD labeled Morrill Decl. Ex. A:. This is the video taped live Declaration of Mr. Robert Morrill, a lead trial counsel for the defense, taken during preparation for litigation. He is describing the operation of the Roblejo Prototype device. See Roblejo patent in 1449 or of record (Jan. 15, 2004). DVD sent to Examiner by US Postal Service with this PTO/SB/08 form.
DVD Labeled "Solberg Decl. Ex. C". Exhibit C to Declaration of Hal Solberg, a witness in litigation, signed Dec. 1, 2003. DVD sent to Examiner by US Postal Service with this PTO/SB/08 form.
DVD labeled "Exhibit 1". This is a video taken by Shuffle Master personnel of the live operation of a CARD One2Six™ Shuffler (Oct. 7, 2003). DVD sent to Examiner by US Postal Service with this PTO/SB/08 form.
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 1 of 23 (Master Index and Binder 1, 1 of 2).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 2 of 23 (Master Index and Binder 1, 2 of 2).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 3 of 23 (Binder 2, 1 of 2).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 4 of 23 (Binder 2, 2 of 2).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 5 of 23 (Binder 3, 1 of 2).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 6 of 23 (Binder 3, 2 of 2).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 7 of 23 (Binder 4, 1 of 2).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 8 of 23 (Binder 4, 2 of 2).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 9 of 23 (Binder 5 having no contents; Binder 6, 1 of 2).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 10 of 23 (Binder 6, 2 of 2).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 11 of 23 (Binder 7, 1 of 2).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 12 of 23 (Binder 7, 2 of 2).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 13 of 23 (Binder 8, 1 of 5).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 14 of 23 (Binder 8, 2 of 5).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 15 of 23 (Binder 8, 3 of 5).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 16 of 23 (Binder 8, 4 of 5).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 16 of 23 (Binder 8, 5 of 5).
Documents submitted in case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, scan of color pages, for clarity, Part 17 of 23 (color copies from Binder 1).
Documents submitted in case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, scan of color pages, for clarity, Part 18 of 23 (color copies from Binder 3).
Documents submitted in case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, scan of color pages, for clarity, Part 19 of 23 (color copies from Binder 4).
Documents submitted in case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, scan of color pages, for clarity, Part 20 of 23 (color copies from Binder 6).
Documents submitted in case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, scan of color pages, for clarity, Part 21 of 23 (color copies from Binder 8, part 1 of 2).
Documents submitted in case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, scan of color pages, for clarity, Part 21 of 23 (color copies from Binder 8, part 2 of 2).
"ACE, Single Deck Shuffler," Shuffle Master, Inc., (2005), 2 pages.

(56) References Cited

OTHER PUBLICATIONS

"Automatic casino card shuffle," Alibaba.com, (last visited Jul. 22, 2014), 2 pages.
"Error Back propagation," http://willamette.edu~gorr/classes/cs449/backprop.html (4 pages), Nov. 13, 2008.
"i-Deal," Bally Technologies, Inc., (2014), 2 pages.
"shufflers—SHFL entertainment," Gaming Concepts Group, (2012), 6 pages.
"TAG Archives: Shuffle Machine," Gee Wiz Online, (Mar. 25, 2013), 4 pages.
1/3" B/W CCD Camera Module EB100 by EverFocus Electronics Corp., Jul. 31, 2001, 3 pgs.
Canadian Office Action for CA 2,580,309 dated Mar. 20, 2012 (6 pages).
Christos Stergiou and Dimitrios Siganos, "Neural Networks," http://www.doc.ic.ac.uk/~nd/surprise_96/journal/vol4/cs11/report.html (13 pages), Dec. 15, 2011.
European Patent Application Search Report—European Patent Application No. 06772987.1, Dec. 21, 2009.
Genevieve Orr, CS-449: Neural Networks Willamette University, http://www.willamette.edu/~gorr/classes/cs449/intro.html (4 pages), Fall 1999.
http://www.google.com/search?tbm=pts&q=Card+handling+devicve+with+input+and+outpu.. Jun. 8, 2012.
http://www.google.com/search?tbm=pts&q=shuffling+zone+onOopposite+site+of+input+. . . Jul. 18, 2012.
Litwiller, Dave, *CCD* vs. *CMOS* : Facts and Fiction reprinted from Jan. 2001 Issue of Photonics Spectra, Laurin Publishing Co. Inc. (4 pages).
Malaysian Patent Application Substantive Examination Adverse Report—Malaysian Patent Application Serial No. PI 20062710, Sep. 6, 2006.
PCT International Preliminary Examination Report for corresponding International Application No. PCT/US02/31105 filed Sep. 27, 2002.
PCT International Preliminary Report on Patentability of the International Searching Authority for PCT/US05/31400, dated 16 Oct 2007, 7 pages.
PCT International Search Report and Written Opinion—International Patent Application No. PCT/US2006/22911, Dec. 28, 2006.
PCT International Search Report and Written Opinion for International Application No. PCT/US2007/023168, dated Sep. 12, 2008, 8 pages.
PCT International Search Report and Written Opinion for International Application No. PCT/US2007/022858, mailed Apr. 18, 2008, 7 pages.
PCT International Search Report and Written Opinion for PCT/US07/15036, dated Sep. 23, 2008, 3 pages.
PCT International Search Report and Written Opinion for PCT/US07/15035, dated Sep. 29, 2008, 3 pages.
PCT International Search Report and Written Opinion of the International Searching Authority for PCT/GB2011/051978, dated Jan. 17, 2012, 11 pages.
PCT International Search Report and Written Opinion of the International Searching Authority for PCT/IB2013/001756, dated Jan. 10, 2014, 7 pages.
PCT International Search Report and Written Opinion of the International Searching Authority for PCT/US11/59797, dated Mar. 27, 2012, 14 pages.
PCT International Search Report and Written Opinion of the International Searching Authority for PCT/US13/59665, dated Apr. 25, 2014, 21 pages.
PCT International Search Report and Written Opinion of the International Searching Authority for PCT/US2008/007069, dated Sep. 8, 2008, 10 pages.
PCT International Search Report and Written Opinion of the International Searching Authority for PCT/US2010/001032, dated Jun. 16, 2010, 11 pages.
PCT International Search Report and Written Opinion, PCT Application No. PCT/US2013/062391, Dec. 17, 2013, 13 pages.
PCT International Search Report and Written Opinion, PCT/US12/48706, Oct. 16, 2012, 12 pages.
PCT International Search Report for International Application No. PCT/US2003/015393, mailed Oct. 6, 2003.
PCT International Search Report for PCT/US2005/034737 dated Apr. 7, 2006 (WO06/039308).
PCT International Search Report for PCT/US2007/022894, dated Jun. 11, 2008, 2 pages.
PCT International Search Report and Written Opinion of the International Searching Authority for PCT/US05/31400, dated Sep. 25, 2007, 8 pages.
PCT International Search Report and Written Opinion, PCT Application No. PCT/US2015/022158, Jun. 17, 2015, 13 pages.
Philippines Patent Application Formality Examination Report—Philippines Patent Application No. 1-2006-000302, Jun 13, 2006.
Press Release for Alliance Gaming Corp., Jul. 26, 2004—Alliance Gaming Announces Control with Galaxy Macau for New MindPlay Baccarat Table Technology, http://biz.yahoo.com/prnews.
Service Manual/User Manual for Single Deck Shufflers: BG1, BG2 and BG3 by Shuffle Master ©1996.
Shuffle Master Gaming, Service Manual, ACETM Single Deck Card Shuffler, (1998), 63 pages.
Shuffle Master Gaming, Service Manual, Let It Ride Bonus® With Universal Keypad, 112 pages, © 2000 Shuffle Master, Inc.
Shuffle Master's Reply Memorandum in Support of Shuffle Master's Motion for Preliminary Injunction for *Shuffle Master, Inc.* vs. *VendingData Corporation*, in the U.S. District Court, District of Nevada, No. CV-S-04-1373-JCM-LRL, Nov. 29, 2004.
Singapore Patent Application Examination Report—Singapore Patent Application No. SE 2008 01914 A, Aug. 6, 2006.
Statement of Relevance of Cited References, Submitted as Part of a Third-Party Submission Under 37 CFR 1.290 on Dec. 7, 2012 (12 pages).
tbm=pts&h1=en Google Search for card handling device with storage area, card removing system pivoting arm and processor . . . .; http://www.google.com/?tbrn=pts&h1=en; Jul. 28, 2012.
Tracking the Tables, by Jack Bularsky, Casino Journal, May 2004, vol. 17, No. 5, pp. 44-47.
United States Court of Appeals for the Federal Circuit Decision Decided Dec. 27, 2005 for Preliminary Injuction for *Shuffle Master, Inc.* vs. *VendingData Corporation*, In the U.S. District Court, District of Nevada, No. CV-S-04-1373-JCM-LRL.
VendingData Corporation's Answer and Counterclaim Jury Trial Demanded for *Shuffle Master, Inc.* vs. *VendingData Corporation*, In the U.S. District Court, District of Nevada, No. CV-S-04-1373-JCM-LRL, Oct. 25, 2004.
VendingData Corporation's Opposition to Shuffle Master Inc.'s Motion for Preliminary Injection for *Shuffle Master, Inc.* vs. *VendingData Corporation*, in the U.S. District Court, District of Nevada, No. CV-S-04-1373-JCM-LRL, Nov. 12, 2004.
VendingData Corporation's Responses to Shuffle Master, Inc.'s First set of interrogatories for *Shuffler Master, Inc.* vs. *VendingData Corporation*, in the U.S. District Court, District of Nevada, No. CV-S-04-1373-JCM-LRL, Mar. 14, 2005.

METHODS FOR HANDLING PLAYING CARDS WITH A CARD HANDLING DEVICE

CROSS-REFERENCE TO RELATED APPLICATIONS

This application is a continuation of U.S. patent application Ser. No. 11/177,013 filed Jul. 7, 2005, now U.S. Pat. No. 8,720,891, issued May 13, 2014, which, in turn, is a continuation of U.S. patent application Ser. No. 11/087,487 filed Mar. 23, 2005, now U.S. Pat. No. 7,976,023, issued Jul. 12, 2011, which is a continuation of U.S. patent application Ser. No. 10/067,794 filed Feb. 8, 2002 now U.S. Pat. No. 6,886,829 issued May 3, 2005, the disclosure of each of which is hereby incorporated herein by this reference in its entirety.

FIELD OF THE INVENTION

The present invention relates to card shuffler devices for live card games and, more particularly, to a card shuffling system controlled by a computer, which is able to capture an image, store, keep track of, and deliver random playing cards, and display the images of the cards.

DISCUSSION OF THE PRIOR ART

Card shuffling machines are electro-mechanical devices that are designed to reorder a deck or multiple decks of playing cards for use in casino games. Recently, games have been developed that require shuffling a single deck of cards into a random order and the delivery of hands of cards to each player. These hands are removed from the machine by an operator and given to the players. Several game strategies require the hands of cards to be delivered to the players in different amounts depending on the selected game. For example, there may be 3, 5, 7 or more cards per hand in each different game. For security reasons, some shufflers count the number of cards in the deck each time a game is dealt.

With players at numerous removed sites for the live card games, a security problem exists that becomes critically important, as there exists a substantial risk of cheating and/or card counting. A need, therefore, exists to create a secure environment that permits the operation of live card games while providing significant security to prevent cheating and card counting.

Pfeiffer et al. (U.S. Pat. No. 4,667,959) discloses an apparatus for storing and selecting cards. The apparatus contains a rotatably mounted carousel, which dispenses playing cards with rollers to slots of an output port. Cards are pre-marked with known markings, such as bar codes, so that the apparatus can keep track of which slot holds which card. A sensor reads the identification markings on the cards.

Soules et al. (U.S. Pat. No. 5,067,713) teaches of coded playing cards and apparatuses for dealing sets of cards. There is provided a deck of cards which is encoded with a bar code that is invisible to the human eye. The cards are coded using an essentially invisible bar code that can be read by an electro-optical reading means which uses light in the infrared or ultra-violet range. The object of this apparatus is to allow the dealer to deal coded playing cards.

The patent to Albrecht (U.S. Pat. No. 5,374,061) discloses a card dispensing shoe having a counting device and method of using. A system is described which uses a specially coded deck of cards indicating the value and suit of the card. The system involves using a special pack of cards encoded with information carrying two types of data: numerical digits and alphabetical characters. The numerical information corresponds to the card value, and the alphabetical information indicates the series of the pack of cards. This information is in the form of the bar code, or some other machine readable format. The sensor senses the code on each card as it is being dealt.

Hill et al. (U.S. Pat. No. 5,722,893) discloses a card dispensing shoe that has a card scanner. The scanner senses each card as it moves downwardly and out from the shoe. The scanner may be an infrared laser scanner capable of reading a bar code imprinted on the cards. Hill et al. also discloses the optical scanning of the cards resulting in a high resolution array which is stored in memory for converting into word vectors. These vectors are subsequently used as input to a feed-forward neural network which is trained using error-back propagation to sense and recognize the possible card suits and card values.

Meissner et al. (U.S. Pat. No. 5,779,546) teaches of an automated gaming system and method of automated gaming. An automated dealing shoe automatically advances and interprets the value of a playing card and provides an interface to a computing system. Optical sensors are employed to record the number of spots and their respective spatial relations to thereby determine the card value McCrea, Jr. has a series of patents teaching of a card shuffling device having image capturing means. These U.S. Pat. Nos. 5,605,334; 5,707,287; 5,735,525; 6,093,103; and 6,117,012 disclose the need for game control via accurately collecting and storing the suit and value of each card received by each player position. The game control stores this information in a memory or a history of each card dealt is recorded. The game control can thus detect winning progressions and automatically issue an award signal.

None of these patents either teaches or suggests a card shuffling device that can shuffle the playing cards in a random order, capture images of the playing cards before output, process the images of the cards, and display the images of the cards, all within the confines of the shuffler. There is no need for complicated card-recognition software, or transforming the image into word vectors, or other card value data expressions, because the images are relayed directly to a display on the shuffler device.

SUMMARY OF THE INVENTION

In the essence of security, this invention expands game security to a higher level. Through the use of image capturing means, e.g., a small digital camera, an image of the face value of each card is taken and stored in computer memory. This image is stored in the format of a bit map image. The operator of the machine would be able to recall, through the use of a key pad, the images of the cards that comprised the individual hands in the previous game or games. This feature would allow the verification of a winning hand after the game had been completed.

One of the biggest game security issues is that of two adjacent players trading cards to produce a winning hand for one of them. The present invention would allow a quick recheck of hands before paying a winning hand. These card images would be stored in memory for archival access for use in monitoring the randomness of the game and determining the number of winning hands. Such information would be very valuable in managing game play.

Therefore, it is an object of the invention to provide a card playing system which shuffles and deals playing cards, and provided with a means for capturing images of the cards being dealt for use in verification, thereby enhancing security matters regarding casino games.

It is another object of the invention to provide a card shuffler which can selectively shuffle playing cards for different card games and/or for different shuffling modes of operation, and is capable of capturing the images of the cards that are dealt.

It is another object of the invention to provide a card shuffler capable of displaying the images of the playing cards to an operator for verification of winning hands.

It is an additional object of the invention to provide a card shuffling machine that selectively shuffles cards for at least two different card games having different shuffling requirements and between at least two selectable modes of operation which can be defined by at least the two different card games, with the added security of card image capturing and relaying of the images for each play station.

It is another object of the invention to provide a card playing system which is simplified and inexpensive to manufacture which provides image capture and on-site image display of the cards being dealt.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

A complete understanding of the present invention may be obtained by reference to the accompanying drawings, when taken in conjunction with the detailed description thereof and in which.

DESCRIPTION OF THE PREFERRED EMBODIMENT

This disclosure of the invention is submitted in furtherance of the constitutional purposes of the United States Patent Laws "to promote the progress of science and useful arts" (Article 1, Section 8).

In accordance with a preferred embodiment of the present invention, herein is described a card shuffler machine which is capable of eliminating one of the most significant security issues: cheating by the substitution of cards. These security issues are more prevalent in specialty card games, such as, but not limited to, Pai Gow Poker. The nature of these games provides possibilities of interactions between card players and/or card counters to manipulate the outcomes of the winnings. As novel means of enhancing game security are needed, the present invention addresses this need by featuring a card shuffler device 100 which can capture an image of the playing cards being dealt, as illustrated generally in FIG. 1.

Figure 1:
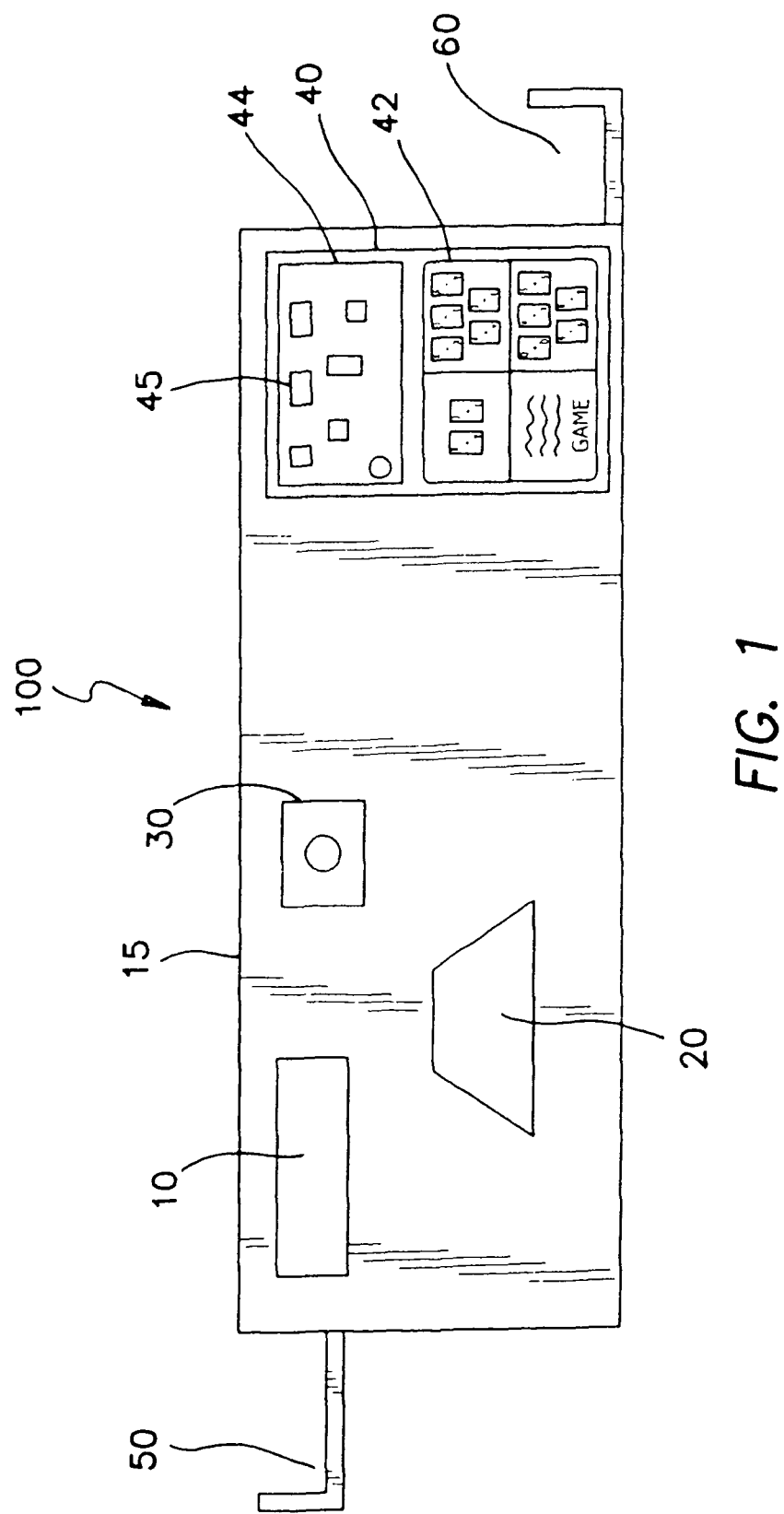
FIG. 1 is a plan view of the preferred embodiment of the invention.

FIG. 1 generally illustrates a diagrammatic or schematic depiction of the card shuffler system 100 of the present invention. The system 100 includes six major components of operation: the controller, the shuffling device 2, image capturing means 30, control panel 40, a card input receptacle 50, and card output bin 60.

Figure 2:
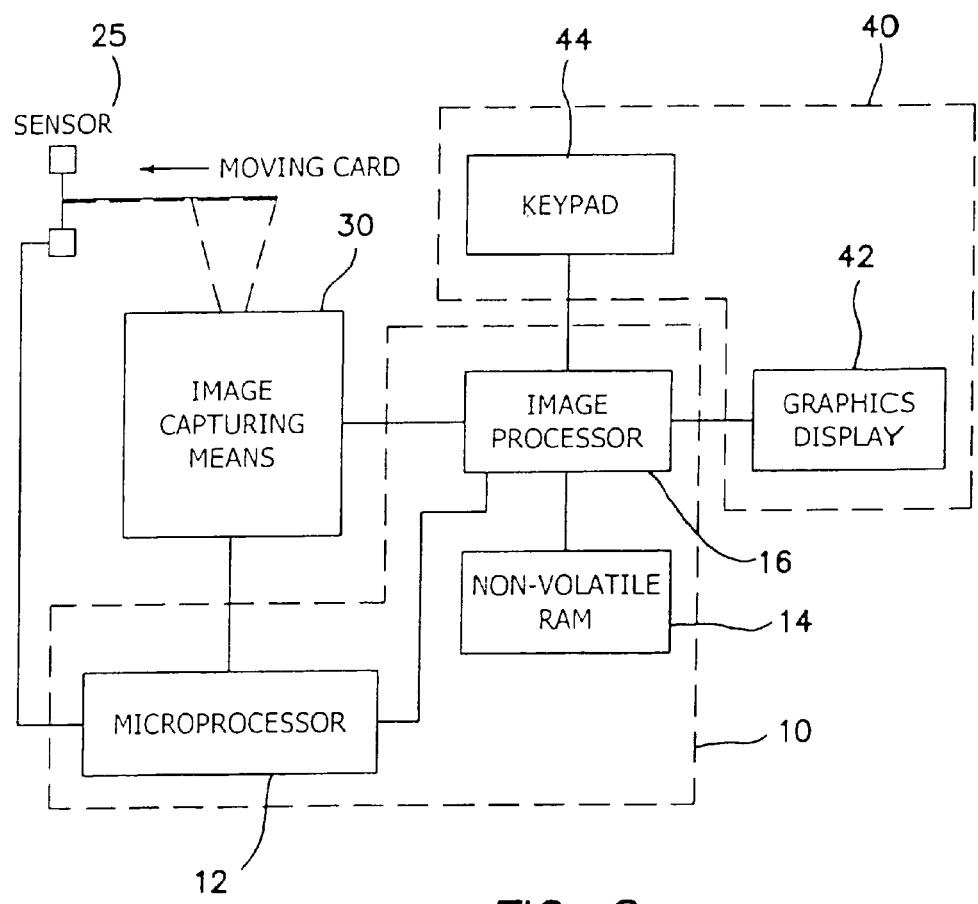
FIG. 2 is a schematic view of a preferred embodiment of the invention illustrating the components in operation.

Preferably, the housing is made of sheet metal (such as aluminum), durable plastic or other tough, durable materials. Keys 45 on keypad 44 are preferably tactile feedback keys, and include indicia thereon for identifying a command a key communicates to a microprocessor 12 (FIG. 2). The keys can also be made of silicon rubber-carbon as is typical for such keys, or the keypad can be a membrane keypad. Controller 10 (and ultimately microprocessor 12) controls the operation of the shuffler system 100 by accepting input data from control panel 40, and displaying output data on display 42. However, it will be understood that other display technologies known in the art, for example, vacuum fluorescent, flat panel display, and segmented LED's, are within the scope of the present invention.

The controller 10 is a system that controls the operation of a shuffling device 20, image capturing means 30, and display means 40 as well as the movement of the cards through the shuffler system 100. The controller 10 contains a suitable microprocessor which serves to orchestrate the operation of all of the components of the shuffler system 100.

This invention includes novel methods for performing automated shuffling of playing cards. The methods include shuffling the cards in a face-to-back relationship, which refers to the standard condition in which playing cards are sold wherein the face of one card is adjacent to the back of the next adjacent card. Herein, the present invention dismisses the need for pre-marked playing cards. Ordinary, unmarked playing cards may be used with ease.

The novel shuffling methods further include the ability to shuffle cards in more than one mode and for a plurality of card games as desired. In the card shuffling arts, two types of shufflers have been introduced. One is a batch mode shuffler and the other is a continuous mode shuffler.

The batch mode shuffler is a device that shuffles a deck or multiple decks of playing cards into a random order. The deck or decks are, at one time, loaded into the shuffler system 100, usually into an input receptacle 50. The cards are shuffled or reordered and presented to the output bin 60. The decks are removed all at once by a person (dealer) who divides the stack of cards, records (cuts) them, and places a marked cut card in the deck in a random position. The dealer then places the cards into a dealing shoe for individual dealing to players in a card game.

At the conclusion of each game, the cards of the hands that have been played by the players are collected from each playing station and discarded face down by the dealer into a discard shoe (not shown). The decks are then placed into the input receptacle 50 and forwarded to the shuffling device 20 to be re-shuffled to begin a new game. This process may include two sets of decks of different color card backs. One set would be shuffling while the other is being played. This reduces the time the game is stopped for shuffling, allowing the dealer to play more hands with the players.

The continuous shuffler is a device that shuffles or re-orders a deck or multiple decks of playing cards into a random order. In the use of this mechanism, the cards are constantly being shuffled by the shuffler system 100. At the end of each game, the cards are discarded directly into the input receptacle 50 of the shuffler 100. A dealing shoe (not shown) is generally built into the output bin 60 of the shuffler 100. The shuffling never stops as long as the game is being played or being prepared to play.

The process of discharging the playing cards is preferably performed by the ejection and displacing of playing cards and forcing them into an output bin 60, for example, as described in detail in U.S. Pat. No. 6,299,167, incorporated herein by reference. Extracting the cards is accomplished by engaging edges of the selected displaced card using a movable extractor. The step is more preferably accomplished by rolling the edges of the selected card using an extraction roller or rollers (not shown). The cards are further guided toward the output bin via an output roller. The image capturing means 30 may be placed between the extraction roller(s) and the output bin 60 (FIG. 1).

In a preferred embodiment of the present invention, the image capturing means 30 may be a digital camera. A conventional digital camera employing charge-coupled device (CCD) technology to obtain the light information of the captured image may be used. The CCD's consist of a semiconducting array of tightly packed rows of light receptors that can detect variation in light intensity and frequency.

The controller has an image processor 16, as shown in FIG. 2, which digitizes the light information gathered by the camera. This information is digitized by translating the recorded images into bitmaps. The bitmaps will then make use of the digitized information by translating it into an image-representation consisting of rows and columns of dots. The present invention includes an on-site image processor 16 which further translates the bitmaps into pixels for display on the display means 42.

Alternatively, the image capturing means 30 can comprise a digital camera (not shown) utilizing complementary metal-oxide semiconductor (CMOS) technology. Herein, CMOS chips have the advantage of using lower power requirements than CCDs. In addition, the CMOS sensor can be loaded with a host of other tasks that can be translated to the operation of the controller, such as analogue to digital converting, load signal processing, handling white balance and more camera controls. For example, CMOS chips are high-resolution sensors with space efficiency capability enabling sensor designs with the possibility of increasing density and bit depth without significant cost increases.

A digital video camera (DV camera) may also be employed to capture digital video images, thereby reducing steps of video microprocessing. The output of a DV camera is already in compressed format. Therefore, all that is needed is to transfer the recorded images straight from the camera for post capture processing.

Analog cameras (non-digital) may be used to capture the image of the cards. These may include video recording cameras. Herein, an analogue-to-digital converter may be used to simplify the image data for displaying output. Any suitable camera or camera-type device known in the art may be used to capture the image of the playing cards.

Any suitable means for capturing image data known in the art, such as, but not limited to, lenses, mirrors, fiber optics, fiber optical transmission tubes, optical sensor arrays, photosensitive diodes and/or any combinations thereof may be used to capture the photonic information and relayed to any choice of camera means to thereby obtain an image of the playing card.

FIG. 2 is a schematic diagram illustrating a systems approach to the operation of the shuffler system 100. A playing card is put into motion by extraction rollers after the shuffling is performed via instruction from the shuffler controller 10. Once the leading edge of this moving card is sensed by sensor 25, an image of the card is taken by the image capturing means 30. This image data is relayed to the image processor 16. The image processor 16 performs the post-capture processing steps. Herein the image data may be converted, mapped, sharpened and compressed. The controller 10 stores the image data in memory into a non-volatile RAM storage 14.

Figure 3:
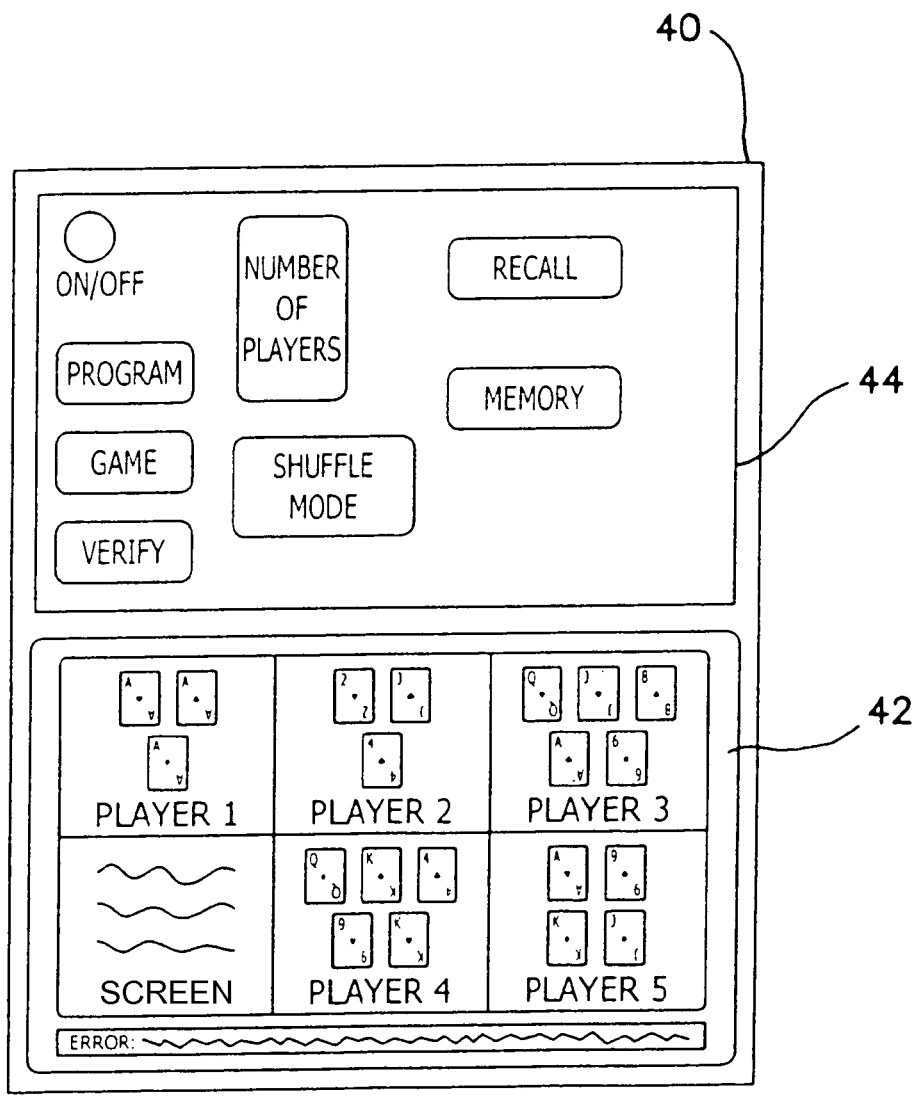
FIG. 3 is a plan view of the control panel in accordance with a preferred embodiment of the present invention.

This stored data may be recalled, by way of prompt messaging from the keypad 44, located on the control panel 40, for display by the graphics display 42. FIG. 3 provides an exemplary illustration of the control panel 40 including the operations controlled by the keypad 44 and images displayed on the display 42.

The microprocessor 12 controls the various functions of the shuffler system 100, for example, and without limitation, the manner of shuffling; whether the shuffling is in batch or continuous mode; the card game, or games, to be shuffled for or dealt, such as Pai Gow Poker, etc. (Again, it will be understood that the type of card game is not a limitation on the present invention). The microprocessor 12 can control the output of the cards such that each player is dealt either a packet of consecutive cards from the shuffled deck or every Nth card from the shuffled deck, N being the number of players plus the dealer (if applicable) at the table.

The microprocessor 12 operates under instruction of programmed software. This software can either be stored as firmware in an application specific memory chip, in a solid state non-volatile memory device or on a magnetic disk from which the software is loaded into an addressable RAM in shuffler system 100 when power is turned on. When the shuffler system 100 is first powered on, the software initializes and clears the display 42.

The operation of selected commands associated with the keys 45 of the control panel 40 will now be described. It will be understood that any of the keys 45 can be included anywhere on the shuffler system 100, and not limited to the control panel 40. In operation, when any key, switch or button is activated by depressing, switching or the like, a signal is electrically transmitted then from the controller 20. A predetermined command is transmitted then from the controller 20 to the shuffler 100 via transmission means. The shuffler 100 then performs the function associated with the command.

The control panel 40 can also include a "GAME" key. The "GAME" key (as shown in FIG. 3) allows the operator to select the type of card game to be played. Different card games require different shuffling and/or dealing methods. When the "GAME" key is depressed, the name of a card game appears on the display 42. The operator can cycle through the different games programmed into the microprocessor's memory by repeatedly pressing the "GAME" key until the desired game is selected. In an alternative embodiment, the control panel 40 can include separate keys for each different card game, or conventional query may be used.

The number of players may be entered by a "NUMBER OF PLAYERS" key (also shown in FIG. 3), thereby instructing the microprocessor 12 to deal a desired number of hands. If there are any particular rules or other information that may alter gameplay, a "PROGRAM" key may be employed to make appropriate changes.

The keypad 44 can include a "VERIFY" key. The "VERIFY" key is provided so that the operator can verify the number of cards that are in the deck at a desired time. Via the microprocessor 12, the shuffler system 100 keeps track of the number of cards that have been dealt during a dealing sequence. After a game, when the "VERIFY" key is pressed, the remaining cards are ejected out of the shuffler 100 into the output bin 60 and counted as they are ejected. This number is added to the number of cards that have been dealt to verify that there is a correct amount of cards in the deck (for example, 52, if one deck is being used). If the number of cards counted is incorrect, the dealer is notified, for example, by a phrase on the display 42, and/or an audible sound via an internal speaker (not shown).

The keypad 44 can also include a key or keys, such as a "GAME" key (as shown in FIG. 3) that prompts the shuffler system 100 to deal a certain number of cards, although it will be understood that any number is within the scope of the present invention.

Also, on the keypad 42 is a "RECALL" key that prompts the shuffler system 100 to recall the present hand or hands dealt to the playing stations. Herein, the images of the cards that are stored in memory 14 are recalled for display means 42. Along, with the image of the cards being displayed, textual message are displayed to designate the cards of each playing station, accordingly.

For example, the phrase "PLAYER 1" may be displayed along with the images of the cards dealt to that particular player, and so forth. A "MEMORY" key may be used, as shown in FIG. 3, to recall the playing hands dealt for past card games. This "MEMORY" key may have subkeys to cycle through the hands, games, and/or playing stations. The images of the past games are accessed from the memory 14 and displayed on the display means 42.

The keypad 44 can also include other keys, such as "SHUFFLE MODE," for selecting the mode of the shuffler, namely, continuous mode, batch mode, the game or games being played, or specialty game mode. The function of the various keys, switches or buttons recited herein is intended to be merely exemplary, and those skilled in the art will be able to make numerous modifications and additions to them without departing from the spirit of the present invention. Moreover, various keys may be soft keys, the function of which is defined by the bottom line on the display 14. The function of the soft keys may change, for example, with the type of game that is selected. This allows for a plurality of functions to be performed while minimizing the number of keys needed.

In a preferred embodiment, the shuffler system 100 includes an indicator for indicating an error condition. Preferably, a designated portion of the display 42 flashes to indicate an error condition. Such error conditions may include, but are not limited to, malfunction of the shuffler, such as a mis-shuffle or a jam in the shuffler, a failure in the electronics, bad deck count, i.e., too many or too few cards in the deck, etc. When the controller 10 receives an error signal, the controller 10 communicates a signal to the "ERROR" indicator, thereby activating the display 42 to indicate the error condition to the operator. Preferably, the display 42 indicates to the operator what the error condition is via an accompanying text message adjacent the "ERROR" indicator.

In a preferred embodiment, the shuffler system 100 includes a device for emitting an audible signal when an error condition is detected. For example, a speaker (not shown) such as an electro-magnetic or piezoelectric speaker or the like that emits a beep or buzz when an error condition is detected. Preferably, the electro-magnetic speaker is in communication and cooperates with the "ERROR" indicator on the display 42 and may be included on any portion of a housing 15.

In another embodiment, the controller 10 can be programmed to display messages on the display 42 in different languages, such as French, Spanish, Italian, etc. A key can be included for cycling through the various language choices.

The display 42 may preferably be in the form of a conventional liquid crystal display format (LCD). The display 42 can be a color or non-color LCD display panel. The display panel 42 may also display images and text data in a plurality of sections to show a plurality of play station information simultaneously. However, the display screen may have a scroll feature to display different screens of information which cannot be contained in a single display. The subsequent screens can be prompted by a "SCREEN" key, as shown in FIG. 3.

Since other modifications and changes varied to fit particular operating requirements and environments will be apparent to those skilled in the art, the invention is not considered limited to the example chosen for purposes of disclosure, and covers all changes and modifications which do not constitute a departure from the true spirit and scope of the invention.

In compliance with the statute, the invention has been described in language more or less specific as to structural and methodical features. It is to be understood, however, that the invention is not limited to the specific features shown and described, since the means herein disclosed comprise preferred means of putting the invention into effect.

The invention is, therefore, claimed in any of its forms or modifications within the proper scope of the appended claims appropriately interpreted in accordance with the doctrine of equivalents.

Having thus described the invention, what is desired to be protected by Letters Patent is presented in the subsequent appended claims.

What is claimed is:

1. A method of handling playing cards with a card handling device, the method comprising:
   shuffling playing cards with a shuffling system located within a housing of the card handling device;
   capturing image data of at least a portion of each playing card with an image capture device located within the housing, the image data comprising at least a suit and a rank of each playing card;
   receiving the image data of the at least a portion of each playing card from the image capture device with a controller located within the housing;
   assigning a group of cards for output as a hand of cards utilizing the controller; outputting the hand of cards from the card handling device; and
   collectively storing the image data of the at least a portion of each playing card with associated hand assignment data for each playing card for archival access in memory located within the housing.

2. The method of claim 1, further comprising processing the image data with the controller.

3. The method of claim 1, wherein capturing image data of at least a portion of each playing card comprises capturing image data comprising at least a suit and a rank of each playing card.

4. The method of claim 1, further comprising selecting one of a batch shuffling mode and a continuous shuffling mode with a control panel in communication with the controller.

5. The method of claim 4, wherein selecting one of a batch shuffling mode and a continuous shuffling mode with a control panel comprises selecting one of a batch shuffling mode and a continuous shuffling mode with a control panel connected to the housing.

6. A method of handling playing cards with a card handling device, the method comprising:
   shuffling playing cards with a shuffling system located within a housing of the card handling device;
   capturing image data of at least a portion of each playing card assigned to a hand of playing cards with an image capture device located within the housing, the image data comprising at least a suit and a rank of each playing card;
   delivering the hand of playing cards to a card delivery area of the card handling device;

receiving the image data of the at least a portion of each playing card of the hand of playing cards from the image capture device with a controller located within the housing;

collectively storing the image data of the at least a portion of each playing card with associated hand assignment data for archival access in memory located within the housing; and displaying the images corresponding to the captured image data of the at least a portion of each playing card of the hand of playing cards on a graphics display connected to the housing.

7. The method of claim 6, further comprising receiving entry of game identification with a control panel in communication with the controller.

8. The method of claim 7, wherein delivering the hand of playing cards to a card delivery area of the card handling device comprises delivering a number of playing cards specific for the game identification entered.

9. The method of claim 6, wherein capturing image data of at least a portion of each playing card assigned to a hand of playing cards comprises capturing image data of data of at least a portion of each playing card assigned to each hand of multiple hands of playing cards.

10. The method of claim 9, wherein delivering the hand of playing cards to a card delivery area of the card handling device comprises delivering the multiple hands of playing cards to the card delivery area.

11. The method of claim 9, further comprising, with the controller, associating the image data of at least a portion of each playing card of the multiple hands of playing cards with player stations to receive respective hands of the multiple hands of playing cards.

12. The method of claim 11, further comprising storing the image data of the multiple hands of playing cards associated with the player stations in memory located within the housing.

13. The method of claim 12, further comprising recalling the image data associated with at least one hand of playing cards to the graphics display.

14. A method of handling playing cards with a card handling device, the method comprising:

shuffling playing cards with a shuffling system located within a housing of the card handling device;

individually moving at least some playing cards shuffled with the shuffling system, and assigned as a group to form a hand, to a card output bin to form the hand for removal from the card handling device;

capturing image data of at least a portion of each playing card of the at least some playing cards with an image capture device located within the housing prior to the at least some playing cards being positioned in the card output bin for removal;

receiving the image data of the at least a portion of each playing card of the at least some playing cards from the image capture device with a controller located within the housing; and collectively storing the image data of the at least a portion of each playing card with associated hand assignment data for archival access in memory located within the housing.

15. The method of claim 14, further comprising displaying images corresponding to the image data of the at least a portion of each playing card of the at least some playing cards with a graphics display connected to the housing.

16. The method of claim 14, wherein individually moving at least some playing cards shuffled with the shuffling system to a card output bin for removal from the card handling device comprises individually moving the at least some playing cards with at least one roller.

* * * * *